US011560320B2

(12) United States Patent
Asano et al.

(10) Patent No.: US 11,560,320 B2
(45) Date of Patent: Jan. 24, 2023

(54) SOLID ELECTROLYTE MATERIAL AND BATTERY

(71) Applicant: Panasonic Intellectual Property Management Co., Ltd., Osaka (JP)

(72) Inventors: Tetsuya Asano, Nara (JP); Akihiro Sakai, Nara (JP); Masashi Sakaida, Hyogo (JP); Yusuke Nishio, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 273 days.

(21) Appl. No.: 16/915,424

(22) Filed: Jun. 29, 2020

(65) Prior Publication Data
US 2020/0335817 A1   Oct. 22, 2020

Related U.S. Application Data

(63) Continuation of application No. PCT/JP2018/046264, filed on Dec. 17, 2018.

(30) Foreign Application Priority Data

Jan. 5, 2018   (JP) .............................. JP2018-000435

(51) Int. Cl.
H01M 10/00 (2006.01)
C01G 25/00 (2006.01)
(Continued)

(52) U.S. Cl.
CPC ............ *C01G 25/006* (2013.01); *C01F 17/36* (2020.01); *C01G 9/006* (2013.01); *C01G 29/006* (2013.01);
(Continued)

(58) Field of Classification Search
CPC .... H01M 10/025; H01M 10/052; H01M 4/62; C01P 2006/40; Y02E 60/10
See application file for complete search history.

(56) References Cited

U.S. PATENT DOCUMENTS 4,352,869 A    10/1982 Mellors
5,506,073 A *  4/1996 Angell .............. H01M 10/0563
                                                    429/315
(Continued)

FOREIGN PATENT DOCUMENTS

CN    105254184 A    1/2016
CN    105680048 A    6/2016
(Continued)

OTHER PUBLICATIONS

G.J. Kipouros et al. Reversible Electrode Potentials for Formation of Solid and Liquid Chlorozirconate and Chlorohafnate Compounds (Year: 1992).*
(Continued)

*Primary Examiner* — Cynthia H Kelly
*Assistant Examiner* — Monique M Wills
(74) *Attorney, Agent, or Firm* — McDermott Will & Emery LLP

(57) ABSTRACT

A solid electrolyte material contains Li, M, and X. M is at least one selected from metallic elements, and X is at least one selected from the group consisting of Cl, Br, and I. A plurality of atoms of X form a sublattice having a closest packed structure. An average distance between two adjacent atoms of X among the plurality of atoms of X is 1.8% or more larger than a distance between two adjacent atoms of X in a rock-salt structure composed only of Li and X.

8 Claims, 7 Drawing Sheets

(51) Int. Cl.

| | | |
|---|---|---|
| *C01F 17/36* | (2020.01) | |
| *C01G 9/00* | (2006.01) | |
| *C01G 29/00* | (2006.01) | |
| *C01G 33/00* | (2006.01) | |
| *C01G 35/00* | (2006.01) | |
| *H01M 10/0525* | (2010.01) | |
| *H01M 10/0562* | (2010.01) | |

(52) U.S. Cl.
CPC ......... *C01G 33/006* (2013.01); *C01G 35/006* (2013.01); *H01M 10/0525* (2013.01); *H01M 10/0562* (2013.01); *C01P 2002/72* (2013.01); *C01P 2002/74* (2013.01); *C01P 2006/40* (2013.01); *H01M 2300/008* (2013.01)

(56) References Cited

U.S. PATENT DOCUMENTS

| | | | |
|---|---|---|---|
| 5,714,279 A * | 2/1998 | Zajac, Jr. | H01M 6/16 |
| | | | 429/207 |
| 9,160,034 B2 | 10/2015 | Kato et al. | |
| 10,008,735 B2 | 6/2018 | Ohtomo et al. | |
| 2004/0151986 A1 | 8/2004 | Park et al. | |
| 2011/0045355 A1 | 2/2011 | Ichikawa | |
| 2012/0301796 A1 | 11/2012 | Ohtomo et al. | |
| 2012/0308900 A1 | 12/2012 | Ogasa | |
| 2013/0295464 A1 | 11/2013 | Yanagi et al. | |
| 2015/0147659 A1 | 5/2015 | Kato | |
| 2016/0103232 A1 | 4/2016 | Ouspenski et al. | |
| 2016/0149259 A1 | 5/2016 | Osada et al. | |
| 2016/0156064 A1 | 6/2016 | Miyashita et al. | |
| 2016/0204467 A1 | 7/2016 | Nogami et al. | |
| 2016/0248119 A1 | 8/2016 | Kato | |
| 2016/0268630 A1 | 9/2016 | Tsukada et al. | |
| 2016/0285078 A1 | 9/2016 | Deschamps et al. | |
| 2016/0308210 A1 | 10/2016 | Sakuda et al. | |
| 2016/0359193 A1 | 12/2016 | Yi et al. | |
| 2017/0040637 A1 | 2/2017 | Ceder et al. | |
| 2017/0179481 A1 | 6/2017 | Kamada et al. | |
| 2017/0187066 A1* | 6/2017 | Tsujimura | H01M 10/0562 |
| 2017/0222257 A1 | 8/2017 | Miyashita et al. | |
| 2017/0229734 A1 | 8/2017 | Furukawa et al. | |
| 2017/0288281 A1 | 10/2017 | Chiang et al. | |
| 2018/0183065 A1 | 6/2018 | Sasaki | |
| 2018/0269521 A1 | 9/2018 | Ohtomo et al. | |
| 2019/0067736 A1 | 2/2019 | Yoshioka et al. | |
| 2019/0088995 A1 | 3/2019 | Asano et al. | |
| 2019/0097266 A1 | 3/2019 | Yamamoto et al. | |
| 2020/0212481 A1 | 7/2020 | Nagamine et al. | |
| 2020/0328454 A1 | 10/2020 | Sakai et al. | |
| 2020/0328455 A1 | 10/2020 | Sakai et al. | |
| 2020/0328457 A1 | 10/2020 | Sakai et al. | |
| 2020/0328460 A1 | 10/2020 | Asano et al. | |
| 2020/0328461 A1 | 10/2020 | Asano et al. | |
| 2020/0328462 A1 | 10/2020 | Asano et al. | |
| 2020/0328464 A1 | 10/2020 | Asano et al. | |
| 2020/0328465 A1 | 10/2020 | Sakaida et al. | |
| 2020/0328468 A1 | 10/2020 | Sakaida et al. | |
| 2020/0328469 A1 | 10/2020 | Asano et al. | |
| 2020/0350615 A1 | 11/2020 | Sakaida et al. | |
| 2020/0350622 A1 | 11/2020 | Sakaida et al. | |

FOREIGN PATENT DOCUMENTS

| | | |
|---|---|---|
| CN | 108701860 A | 10/2018 |
| EP | 2916381 B1 | 6/2016 |
| EP | 3428929 A1 | 1/2019 |
| EP | 3496202 A1 | 6/2019 |
| EP | 3736831 A1 | 11/2020 |
| EP | 3736834 A1 | 11/2020 |
| EP | 3736899 A1 | 11/2020 |
| EP | 3745422 A1 | 12/2020 |
| EP | 3745518 A1 | 12/2020 |
| IN | 201847045950 A | 2/2019 |
| JP | S57-132677 A | 8/1982 |
| JP | H05-306117 A | 11/1993 |
| JP | H08-171938 A | 7/1996 |
| JP | H09-293516 A | 11/1997 |
| JP | 11-238528 A | 8/1999 |
| JP | 2001-052733 A | 2/2001 |
| JP | 2004-235155 A | 8/2004 |
| JP | 2006-244734 A | 9/2006 |
| JP | 2008-021556 A | 1/2008 |
| JP | 2011-129312 | 6/2011 |
| JP | 5076134 B2 | 11/2012 |
| JP | 2012-246196 A | 12/2012 |
| JP | 2013-073791 A | 4/2013 |
| JP | 2015-011901 A | 1/2015 |
| JP | 2015-032529 A | 2/2015 |
| JP | 2015-056349 A | 3/2015 |
| JP | 2016-024874 A | 2/2016 |
| JP | 2016-171067 A | 9/2016 |
| JP | 2017-059342 A | 3/2017 |
| JP | 2017-091953 A | 5/2017 |
| JP | 2017-091955 A | 5/2017 |
| JP | 2017-117753 A | 6/2017 |
| JP | 2017-518622 A | 7/2017 |
| JP | 2017-152324 A | 8/2017 |
| JP | 6222134 B2 | 11/2017 |
| JP | 2017-224474 A | 12/2017 |
| WO | 2011/073798 A2 | 6/2011 |
| WO | 2015/011937 A1 | 1/2015 |
| WO | 2015/030052 A1 | 3/2015 |
| WO | 2015/049986 A1 | 4/2015 |
| WO | 2017/108105 A1 | 6/2017 |
| WO | 2017/154766 A1 | 9/2017 |
| WO | 2017/154922 A1 | 9/2017 |
| WO | 2018/025582 A1 | 2/2018 |

OTHER PUBLICATIONS

Indian Examination Report dated Mar. 28, 2022 for the related Indian Patent Application No. 202047027797.
Indian Examination Report dated Apr. 4, 2022 for the related Indian Patent Application No. 202047027476.
International Search Report of International Application No. PCT/JP2018/043363 dated Feb. 19, 2019.
International Search Report of International Application No. PCT/JP2018/041893 dated Feb. 19, 2019.
International Search Report of International Application No. PCT/JP2018/041892 dated Feb. 19, 2019.
International Search Report of International Application No. PCT/JP2018/041894 dated Feb. 19, 2019.
International Search Report of International Application No. PCT/JP2018/046258 dated Feb. 5, 2019.
International Search Report of International Application No. PCT/JP2018/046259 dated Mar. 12, 2019.
International Search Report of International Application No. PCT/JP2018/046260 dated Mar. 12, 2019.
International Search Report of International Application No. PCT/JP2018/046262 dated Mar. 19, 2019.
International Search Report of International Application No. PCT/JP2018/041900 dated Feb. 19, 2019.
International Search Report of International Application No. PCT/JP2018/041897 dated Feb. 19, 2019.
International Search Report of International Application No. PCT/JP2018/046263 dated Mar. 19, 2019.
International Search Report of International Application No. PCT/JP2018/042061 dated Feb. 19, 2019.
International Search Report of International Application No. PCT/JP2018/042062 dated Feb. 19, 2019.
Yasumasa Tomita et al., "Lithium ion conductivity of Li3InBr6 doped with different element", Denka Chemical Society 70th Anniversary Conference Abstracts, Mar. 25, 2003, p. 384; with English translation.
Yasumasa Tomita et al., "Preparation of Substituted Compounds of Lithium Indium Bromide and Fabrication of All Solid-State battery", Recent Innovations in Chemical Engineering, 2017, 10, 12-17.

(56) References Cited

OTHER PUBLICATIONS

The Extended European Search Report dated Jan. 29, 2021 for the related European Patent Application No. 18898666.5.
The Extended European Search Report dated Feb. 5, 2021 for the related European Patent Application No. 18898795.2.
The Extended European Search Report dated Feb. 9, 2021 for the related European Patent Application No. 18898242.5.
The Extended European Search Report dated Feb. 9, 2021 for the related European Patent Application No. 18898043.7.
The Extended European Search Report dated Feb. 9, 2021 for the related European Patent Application No. 18898663.2.
The Extended European Search Report dated Feb. 9, 2021 for the related European Patent Application No. 18898873.7.
The Extended European Search Report dated Feb. 9, 2021 for the related European Patent Application No. 18898935.4.
The Extended European Search Report dated Feb. 9, 2021 for the related European Patent Application No. 18902720.4.
The Extended European Search Report dated Feb. 9, 2021 for the related European Patent Application No. 18898525.3.
The Extended European Search Report dated Feb. 10, 2021 for the related European Patent Application No. 18898462.9.
The Extended European Search Report dated Feb. 15, 2021 for the related European Patent Application No. 18898524.6.
Lutz H D et al: "Ionic motion of tetrahedrally and octahedrally coordinated lithium ions in ternary and quaternary halides", Solid State Ionics, North Holland Pub. Company. Amsterdam; NL, NL, vol. 28-30, Sep. 1, 1988?(Sep. 1, 1988), pp. 1282-1286, XP024682689.
Tetsuya Asano; Akihiro Sakai; Satoru Ouchi; Masashi Sakaida; Akinobu Miyazaki; Shinya Hasegawa: "Solid Halide Electrolytes with High Lithium-Ion Conductivity for Application in 4 V Class Bulk-Type All-Solid-State Batteries", Advanced Materials, vol. 30, No. 44, Sep. 14, 2018?(Sep. 14, 2018), p. 1803075, XP055721991.
International Search Report of PCT application No. PCT/JP2018/046264 dated Mar. 19, 2019.

Andreas Bohnsack et al., "The bromides Li3MBr6 (M=Sm—Lu,Y): Synthesis, Crystal Structure, and Ionic Mobility", Journal of Inorganic and General Chemistry, Sep. 1997, vol. 623/Issue 9, pp. 1352-1356.
Andreas Bohnsack et al., "Ternary Chlorides of the Rare-Earth Elements with Lithium, Li3MCl6 (M=Tb—Lu, Y, Sc): Synthesis, Crystal Structures, and Ionic Motion", Journal of Inorganic and General Chemistry, Jul. 1997, vol. 623/Issue 7, pp. 1067-1073.
English Translation of Chinese Search Report dated Jul. 6, 2021 for the related Chinese Patent Application No. 201880071236.0.
English Translation of Chinese Search Report dated Jul. 30, 2021 for the related Chinese Patent Application No. 201880071076.X.
English Translation of Chinese Search Report dated Aug. 2, 2021 for the related Chinese Patent Application No. 201880070620.9.
Indian Examination Report dated Apr. 29, 2022 for the related Indian Patent Application No. 202047027475.
Indian Examination Report dated May 25, 2022 for the related Indian Patent Application No. 202047027723.
Indian Examination Report dated Jun. 13, 2022 for the related Indian Patent Application No. 202047027726.
Indian Examination Report dated Jun. 14, 2022 for the related Indian Patent Application No. 202047027488.
Tomita, Y. et al., "Substitution effect of ionic conductivity in lithium ion conductor, Li3InBr6-xClx.," Solid State Ionics 179.21-26 (2008): 867-870. (Year: 2008).
Steiner, H.-J., and H. D. Lutz, "Neue schnelle Ionenleiter vom Typ MI3 MIIICl6 (MI=Li, Na, Ag; MIII=In, Y)." Zeitschrift fur anorganhische und allgemeine Chemie 613.7 (1992): 26-30 (Year: 1992).
Tomita, Yasumasa et al. "Substitution effect in the ion conductor Li3InBr6, studied by nuclear magnetic resonance." Zeitschrift fur Naturforschung A 57.6-7 (2002): 447-450 (Year: 2002).
Tomita, Yasumasa et al. "Synthesis of Li3+ xIn1-xMxBr6 (M=Zn, Co, Fe) by Nano-grinding and their Ionic Conductivity." Transactions of the Materials Research Society of Japan 33.4 (2008): 973-976 (Year: 2008).
Indian Examination Report dated Jun. 21, 2022 for the related Indian Patent Application No. 202047027487.

\* cited by examiner

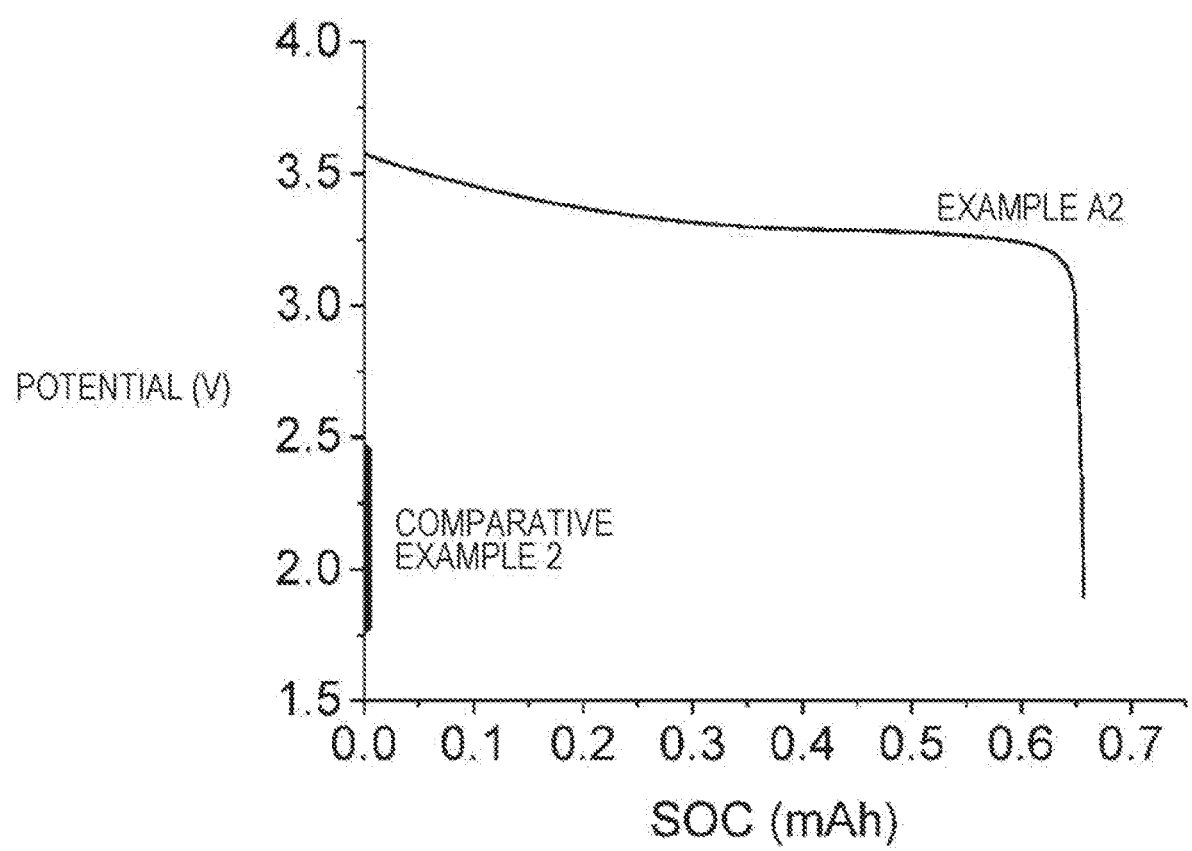

SOLID ELECTROLYTE MATERIAL AND BATTERY

BACKGROUND

1. Technical Field

The present disclosure relates to a solid electrolyte material and a battery.

2. Description of the Related Art

Japanese Unexamined Patent Application Publication No. 2011-129312 discloses an all-solid battery using a sulfide solid electrolyte.

Z. Anorg. Allg. Chem. 623 (1997), 1067-1073. discloses $Li_3YCl_6$.

Z. Anorg. Allg. Chem. 623 (1997), 1352-1356. discloses $Li_3YBr_6$.

SUMMARY

In one general aspect, the techniques disclosed here feature a solid electrolyte material containing Li, M, and X. M is at least one selected from metallic elements, and X is at least one selected from the group consisting of Cl, Br, and I. A plurality of atoms of X form a sublattice having a closest packed structure. An average distance between two adjacent atoms of X among the plurality of atoms of X is 1.8% or more larger than a distance between two adjacent atoms of X in a rock-salt structure composed only of Li and X.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a graph illustrating initial discharge characteristics;

DETAILED DESCRIPTION

Figure 1:
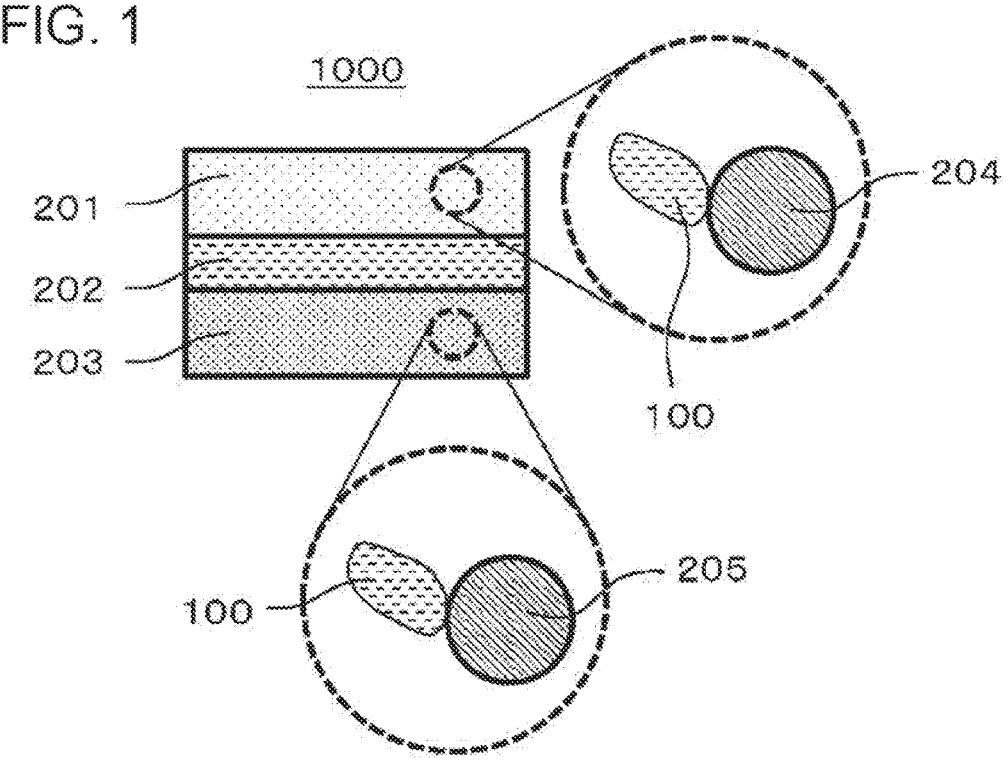
FIG. 1 is a sectional view illustrating the schematic configuration of a battery according to Embodiment 3.

Hereinafter, embodiments according to the present disclosure will be described with reference to drawings.

Embodiment 1

A solid electrolyte material according to Embodiment 1 is a material composed of Li and M, which are cations, and X, which is an anion.

M is at least one selected from metallic elements.

X is at least one selected from the group consisting of Cl, Br, and I.

In the solid electrolyte material according to Embodiment 1, a plurality of atoms of X form a sublattice having a closest packed structure.

In the solid electrolyte material according to Embodiment 1, among the plurality of atoms of X, the average distance between two adjacent atoms of X is 1.8% or more larger than the distance between two adjacent atoms of X in a rock-salt structure composed only of Li and X.

These features provide a solid electrolyte material having a high lithium-ion conductivity, that is, a halide solid electrolyte material.

In addition, use of the solid electrolyte material according to Embodiment 1 having the above-described features provides an all-solid secondary battery having good charge/discharge characteristics.

In addition, use of the solid electrolyte material according to Embodiment 1 provides a sulfur-free all-solid secondary battery. In other words, the solid electrolyte material according to Embodiment 1 does not have a composition that generates hydrogen sulfide upon exposure to the air (for example, the composition of Japanese Unexamined Patent Application Publication No. 2011-129312). This provides an all-solid secondary battery that does not generate hydrogen sulfide and has high safety.

Incidentally, the X-ray diffraction pattern of the solid electrolyte material according to Embodiment 1 is converted such that the abscissa axis represents, instead of diffraction angle 2θ, q, to provide a first conversion pattern including a reference peak in a range of q of 2.11 Å$^{-1}$ or more and 2.31 Å$^{-1}$ or less.

In this case, q=4π sin θ/λ where λ is the wavelength of the X-ray.

The X-ray diffraction pattern is converted such that the abscissa axis represents, instead of diffraction angle 2θ, $q/q_2$, to provide a second conversion pattern including a peak in at least one selected from the group consisting of a first range of $q/q_2$ of 0.50 or more and 0.52 or less, a second range of $q/q_2$ of 1.28 or more and 1.30 or less, and a third range of $q/q_2$ of 1.51 or more and 1.54 or less.

In this case, $q_2$ is a value of q corresponding to the reference peak in the first conversion pattern.

These features provide a solid electrolyte material having a high lithium-ion conductivity.

Incidentally, the solid electrolyte material according to Embodiment 1 may satisfy:

$$a_{ave}/a_{LiX} > 1.018 \qquad (1)$$

This feature provides a solid electrolyte material having a high lithium-ion conductivity.

In this case, $$a_{ave} = 2\pi(\Sigma_{i=1}^{4}\sqrt{2}c_i/q_i)/n \quad (2)$$

$q_1$ is a value of q at the peak included in the first range.
$q_2$ is the above-described value of $q_2$.
$q_3$ is a value of q at the peak included in the second range.
$q_4$ is a value of q at the peak included in the third range.
$c_1=2/3$, $c_2=\sqrt{(41/24)}$, $c_3=\sqrt{(17/6)}$, and $c_4=2$. However, when a sufficient diffraction intensity is not detected, so that, in the second conversion pattern, a peak corresponding to $q_i$ among $q_1$ to $q_4$ is not included in the above-described range, $c_i=0$.

Specifically, when the peak is included in the first range, $c_1=2/3$. When the peak is not included in the first range, $c_1=0$.

$$c_2=\sqrt{(41/24)}$$

When the peak is included in the second range, $c_3=\sqrt{(17/6)}$. When the peak is not included in the second range, $c_3=0$.

When the peak is included in the third range, $c_4=2$. When the peak is not included in the third range, $c_4=0$.

n is the number of $c_i$ that satisfy $c_i \neq 0$. For example, when all $c_i$ satisfy $c_i \neq 0$, $n=4$.

In Formula (1), $a_{LiX}$ is:

$$a_{LiX} = x_{Cl}a_{LiCl} + x_{Br}a_{LiBr} + x_I a_{LiI} \quad (3)$$

In the solid electrolyte material according to Embodiment 1, X includes Cl, Br, and I in a molar ratio of Cl:Br:I=$x_{Cl}$:$x_{Br}$:$x_I$ (where $x_{Cl}+x_{Br}+x_I=1$).

$a_{LiCl}=5.130$ Å (=lattice constant of LiCl), $a_{LiBr}=5.500$ Å (=lattice constant of LiBr), and $a_{LiI}=6.0257$ Å (=lattice constant of LiI).

Incidentally, the solid electrolyte material according to Embodiment 1 may include a first crystal phase. The first crystal phase may be a crystal phase that provides the above-described characteristic diffraction pattern.

Thus, the solid electrolyte material according to Embodiment 1 may include the first crystal phase.

In the first crystal phase that provides the above-described characteristic diffraction pattern, anions form a sublattice having a structure in which atoms are arranged in a hexagonal closest packed structure or a distorted hexagonal closest packed structure; and, in the structure, the average distance between anions is 1.8% or more expanded, compared with crystals having a rock-salt structure and composed of Li and a halogen. In general, it has been considered that, when anions form a closest packed structure, a high ion conductivity is not exhibited (Nature Materials 14, 1026-1031 (2015)). On the other hand, the inventors performed studies and, as a result, have found that, when anions have a hexagonal closest packed structure and satisfy Formula (1) above, a high lithium-ion conductivity of $1\times10^{-4}$ S/cm or more is provided. This is inferentially achieved because the expanded lattices promote conduction from octahedral sites to metastable tetrahedral sites, which is the rate-determining step of ion conduction.

This feature provides a solid electrolyte material having a higher lithium-ion conductivity.

The first crystal phase that provides the above-described characteristic diffraction pattern is not limited to a specific crystal structure, and may be, for example, the following crystal structure.

Examples include a $Li_3ErCl_6$ (hereafter, also referred to as LEC) structure having a crystal structure belonging to the space group P-3m1 and a $Li_3YbCl_6$ (hereafter, also referred to as LYC) structure having a crystal structure belonging to the space group Pnma. The detailed atomic arrangements of such structures are illustrated in Inorganic Crystal Structure Database (ICSD) (LEC structure: ICSD No. 50151, LYC structure: ICSD No. 50152).

Incidentally, the solid electrolyte material according to Embodiment 1 may include a different crystal phase having a crystal structure different from that of the first crystal phase.

Incidentally, in determination of $q_1$ to $q_4$ above, when peaks having high intensities are in close proximity to each other, the weighted average of the proximate peaks may be calculated in terms of the peak positions and the peak intensities to determine $q_1$ to $q_4$. Specifically, for example, when peaks having intensities of $I_{11}$ and $I_{12}$ are present at proximate positions of $q_{11}$ and $q_{12}$, $q_1$ may be determined as $q_1=(q_{11}I_{11}+q_{12}I_{12})/(I_{11}+I_{12})$.

In this case, in consideration of the symmetry of the crystal structure, the weighted average of peaks that are equivalent in consideration of imaginary higher order symmetry may be calculated. Specifically, for example, the above-described LYC structure, which is a rhombic crystal structure, can be regarded as, with focus on the arrangement of anions alone, a distorted hexagonal closest packed structure as described above. When the LYC structure is approximated as a hexagonal closest packed structure, the (401) plane and the (231) plane of the LYC structure are approximately equivalent to the (101) plane of the hexagonal closest packed structure. Thus, when diffraction peaks from the (401) plane and the (231) plane can be separated from each other, weighted average calculated using weights of intensities of both peaks may be used to determine $q_x$.

In the first crystal phase, among constituent elements, the number of moles of cations may be smaller than the number of moles of anions. In this case, vacant sites for conduction of lithium ions are formed to increase the ion conductivity.

Embodiment 2

Hereinafter, Embodiment 2 will be described. Some descriptions having been described in Embodiment 1 above may not be repeated.

A solid electrolyte material according to Embodiment 2 has, in addition to the above-described features of the solid electrolyte material according to Embodiment 1, the following features.

The X-ray diffraction pattern of the solid electrolyte material according to Embodiment 2 is converted such that the abscissa axis represents, instead of diffraction angle 2θ, q, to provide a first conversion pattern including a reference peak in a range of q of 1.76 Å$^{-1}$ or more and 2.18 Å$^{-1}$ or less.

In this case, $q=4\pi \sin \theta/\lambda$ where $\lambda$ is the wavelength of the X-ray.

The X-ray diffraction pattern is converted such that the abscissa axis represents, instead of diffraction angle 2θ, $q/q_1'$, to provide a second conversion pattern including a peak in at least one selected from the group consisting of a first range of $q/q_1'$ of 1.14 or more and 1.17 or less, a second range of $q/q_1'$ of 1.62 or more and 1.65 or less, a third range of $q/q_1'$ of 1.88 or more and 1.94 or less, and a fourth range of $q/q_1'$ of 1.9 or more and 2.1 or less.

In this case, $q_1'$ is a value of q corresponding to the reference peak in the first conversion pattern.

These features provide a solid electrolyte material having a high lithium-ion conductivity, that is, a halide solid electrolyte material.

In addition, use of the solid electrolyte material according to Embodiment 2 having the above-described features provides an all-solid secondary battery having good charge/discharge characteristics.

Incidentally, the solid electrolyte material according to Embodiment 2 may satisfy:

$$a_{ave}/a_{LiX} > 1.018 \quad (1)$$

This feature provides a solid electrolyte material having a high lithium-ion conductivity.

In this case, $$a_{ave} = 2\pi(\Sigma_{i=1}^{5} c_i'/q_i')/n' \quad (4)$$

$q_1'$ is the above-described value of $q_1'$.
$q_2'$ is a value of q at the peak included in the first range.
$q_3'$ is a value of q at the peak included in the second range.
$q_4'$ is a value of q at the peak included in the third range.
$q_5'$ is a value of q at the peak included in the fourth range.
$c_1'=3$, $c_2'=2$, $c_3'=2\sqrt{2}$, $c_4'=\sqrt{11}$, and $c_5'=\sqrt{12}$. However, when a sufficient diffraction intensity is not detected, so that a peak corresponding to $q_i'$ among $q_1'$ to $q_5'$ is not included in the above-described range, $c_i'=0$.

Specifically, $c_1'=\sqrt{3}$.

When the peak is included in the first range, $c_2'=2$. When the peak is not included in the first range, $c_2'=0$.

When the peak is included in the second range, $c_3'=2\sqrt{2}$. When the peak is not included in the second range, $c_3'=0$.

When the peak is included in the third range, $c_4'=\sqrt{11}$. When the peak is not included in the third range, $c_4'=0$.

When the peak is included in the fourth range, $c_5'=\sqrt{12}$. When the peak is not included in the fourth range, $c_5'=0$.

n' is the number of $c_i'$ that satisfy $c_i' \neq 0$. For example, when all $c_i'$ satisfy $c_i' \neq 0$, n=5.

$a_{LiX}$ is Formula (3) described above in Embodiment 1.

Incidentally, the solid electrolyte material according to Embodiment 2 may include a second crystal phase. The second crystal phase may be a crystal phase that provides the above-described characteristic diffraction pattern.

Thus, the solid electrolyte material according to Embodiment 2 may include the second crystal phase.

In the second crystal phase that provides the above-described characteristic diffraction pattern, anions form a sublattice having a structure in which atoms are arranged in a cubic closest packed structure or a distorted cubic closest packed structure; and, in the structure, compared with crystals having a rock-salt structure and composed of Li and a halogen, the lattice constant corresponding to the rock-salt structure is 1.8% or more expanded. In general, it has been considered that, when anions form a closest packed structure, a high ion conductivity is not exhibited (Nature Materials 14, 1026-1031 (2015)). On the other hand, the inventors performed studies and, as a result, have found that, when anions have a cubic closest packed structure and satisfy Formula (1) above, a high lithium-ion conductivity of $1 \times 10^{-4}$ S/cm or more is provided. This is inferentially achieved because the expanded lattices promote conduction from octahedral sites to metastable tetrahedral sites, which is the rate-determining step of ion conduction.

The second crystal phase that provides the above-described characteristic diffraction pattern is not limited to a specific crystal structure, and may be, for example, the following crystal structure.

An example is $Li_3ErBr_6$ (hereafter, also referred to as LEB) structure having a crystal structure belonging to the space group C2/m. The detailed atomic arrangement of the structure is illustrated in Inorganic Crystal Structure Database (ICSD) (ICSD No. 50182). Other examples include a spinel structure and an inverse spinel structure belonging to the space group Fd-3m and Imma, for example.

Incidentally, the solid electrolyte material according to Embodiment 2 may include a different crystal phase having a crystal structure different from that of the second crystal phase.

This feature provides a solid electrolyte material having a higher lithium-ion conductivity.

Incidentally, in determination of $q_1'$ to $q_5'$ above, when peaks having high intensities are in close proximity to each other, the weighted average of the proximate peaks may be calculated in terms of the peak positions and the peak intensities to determine $q_1'$ to $q_5'$. Specifically, for example, when peaks having intensities of $I_{11}'$ and $I_{12}'$ are present at proximate positions of $q_{11}'$ and $q_{12}'$, $q_1'$ may be determined as $q_1'=(q_{11}'I_{11}'+q_{12}'I_{12}')/(I_{11}'+I_{12}')$.

In this case, in consideration of the symmetry of the crystal structure, the weighted average of peaks that are equivalent in consideration of imaginary higher order symmetry may be calculated. Specifically, for example, the above-described LYB structure, which is a monoclinic crystal structure, can be regarded as, with focus on the arrangement of anions alone, a distorted cubic closest packed structure as described above. When the LYB structure is approximated as a rock-salt structure, the (20-2) plane and the (131) plane of the LYB structure are approximately equivalent to the (200) plane of the rock-salt structure. Thus, when diffraction peaks from the (20-2) plane and the (131) plane can be separated from each other, weighted average calculated using weights of intensities of both peaks may be used to determine $q_x'$.

In the second crystal phase, among constituent elements, the number of moles of cations may be smaller than the number of moles of anions. In this case, vacant sites for conduction of lithium ions are formed, which results in an increase in the ion conductivity.

The shape of the solid electrolyte material according to Embodiment 1 or 2 is not particularly limited, and may be, for example, an acicular shape, a spherical shape, or an elliptical spherical shape. For example, the solid electrolyte material according to Embodiment 1 or 2 may be particles. A plurality of particles may be stacked and then pressed so as to have a pellet shape or a plate shape.

For example, when the solid electrolyte material according to Embodiment 1 or 2 has a particulate shape (for example, a spherical shape), it may have a median diameter of 0.1 µm or more and 100 µm or less.

In Embodiment 1 or 2, the median diameter may be 0.5 µm or more and 10 µm or less.

These features provide a higher ion conductivity and formation of a better diffusion state of the solid electrolyte material according to Embodiment 1 or 2 and, for example, an active material.

In Embodiment 1 or 2, the solid electrolyte material may have a smaller median diameter than the active material.

This feature provides formation of a better diffusion state of the solid electrolyte material according to Embodiment 1 or 2 and, for example, the active material.

Incidentally, in the present disclosure, the phrase "range of predetermined value A of value B to value C" means "range of B≤A≤C".

Method for Producing Solid Electrolyte Material

The solid electrolyte material according to Embodiment 1 or 2 may be produced by, for example, the following method.

Binary-halide raw material powders are prepared so as to provide target constituent elements. For example, in the case of producing a solid electrolyte material having a composition of $Li_{2.5}Y_{0.5}Zr_{0.5}Cl_6$, LiCl, $YCl_3$, and $ZrCl_4$ are prepared in a molar ratio of 2.5:0.5.05. At this time, the species of the raw material powders can be selected to thereby determine the composition of the anions. The raw material powders are sufficiently mixed, and then a mechanochemical milling process is performed to mix, pulverize, and react the raw material powders. Subsequently, firing may be performed in a vacuum or an inert atmosphere. Alternatively, the raw material powders may be sufficiently mixed, and then fired in a vacuum or an inert atmosphere. The firing may be performed under firing conditions of, for example, a range of 100° C. to 650° C. for 1 hour or more.

Thus, a solid electrolyte material having the above-described composition is provided.

Incidentally, in the solid material, the configuration of the crystal phase, the crystal structure, and the positions of the peaks in the X-ray diffraction pattern obtained using Cu-Kα as the ray source and conversion patterns can be determined by adjusting the raw material ratio and by adjusting the reaction process and reaction conditions of the raw material powders.

Embodiment 3

Hereinafter, Embodiment 3 will be described. Some descriptions having been described in Embodiment 1 or 2 above may not be repeated.

A battery according to Embodiment 3 is provided using the above-described solid electrolyte material according to Embodiment 1 or 2.

The battery according to Embodiment 3 includes a solid electrolyte material, a positive electrode, a negative electrode, and an electrolyte layer.

The electrolyte layer is a layer disposed between the positive electrode and the negative electrode.

At least one of the positive electrode, the electrolyte layer, and the negative electrode includes the solid electrolyte material according to Embodiment 1 or 2.

These features provide improved charge/discharge characteristics of the battery.

Hereinafter, a specific example of the battery according to Embodiment 3 will be described.

FIG. 1 is a sectional view illustrating the schematic configuration of a battery 1000 according to Embodiment 3.

The battery 1000 according to Embodiment 3 includes a positive electrode 201, a negative electrode 203, and an electrolyte layer 202.

The positive electrode 201 includes positive electrode active material particles 204 and solid electrolyte particles 100.

The electrolyte layer 202 is disposed between the positive electrode 201 and the negative electrode 203.

The electrolyte layer 202 includes an electrolyte material (such as a solid electrolyte material).

The negative electrode 203 includes negative electrode active material particles 205 and solid electrolyte particles 100.

The solid electrolyte particles 100 are particles composed of the solid electrolyte material according to Embodiment 1 or 2, or particles including, as a main component, the solid electrolyte material according to Embodiment 1 or 2.

The positive electrode 201 includes a material having a property of storing and releasing metal ions (such as lithium ions). The positive electrode 201 includes, for example, a positive electrode active material (such as positive electrode active material particles 204).

Examples of the positive electrode active material include lithium-containing transition metal oxides (such as Li(Ni-CoAl)$O_2$ and LiCoO$_2$), transition metal fluorides, polyanions and fluorinated polyanion materials, transition metal sulfides, transition metal oxyfluorides, transition metal oxysulfides, and transition metal oxynitrides.

The positive electrode active material particles 204 may have a median diameter of 0.1 μm or more and 100 μm or less. When the positive electrode active material particles 204 have a median diameter of less than 0.1 μm, in the positive electrode, the positive electrode active material particles 204 and the halide solid electrolyte material may not form a good diffusion state. This results in degradation of the charge/discharge characteristics of the battery. When the positive electrode active material particles 204 have a median diameter of more than 100 μm, lithium diffuses slowly in the positive electrode active material particles 204. This may make it difficult for the battery to operate at a high power.

The positive electrode active material particles 204 may have a median diameter larger than the median diameter of the halide solid electrolyte material. This results in a good diffusion state of the positive electrode active material particles 204 and the halide solid electrolyte material.

The volume ratio "v:100−v" of the positive electrode active material particles 204 and the halide solid electrolyte material included in the positive electrode 201 may satisfy 30≤v≤95. When v<30, it may be difficult to ensure a sufficient energy density of the battery. When v>95, operation at a high power may be difficult.

The positive electrode 201 may have a thickness of 10 μm or more and 500 μm or less. When the positive electrode 201 has a thickness of less than 10 μm, it may be difficult to ensure a sufficient energy density of the battery. When the positive electrode 201 has a thickness of more than 500 μm, operation at a high power may be difficult.

The electrolyte layer 202 is a layer including an electrolyte material. The electrolyte material is, for example, a solid electrolyte material. Thus, the electrolyte layer 202 may be a solid electrolyte layer.

Incidentally, the solid electrolyte layer may include, as a main component, the above-described solid electrolyte material according to Embodiment 1 or 2. Specifically, the solid electrolyte layer may include the above-described solid electrolyte material according to Embodiment 1 or 2, for example, in a weight percentage of 50% or more (50% by weight or more) relative to the whole solid electrolyte layer.

This feature provides further improved charge/discharge characteristics of the battery.

The solid electrolyte layer may include the above-described solid electrolyte material according to Embodiment 1 or 2, for example, in a weight percentage of 70% or more (70% by weight or more) relative to the whole solid electrolyte layer.

This feature provides further improved charge/discharge characteristics of the battery.

Incidentally, the solid electrolyte layer, which may include, as a main component, the above-described solid electrolyte material according to Embodiment 1 or 2, may further include, for example, inevitable impurities or starting raw materials, by-products, and decomposition products during synthesis of the above-described solid electrolyte material.

Alternatively, the solid electrolyte layer may include the solid electrolyte material according to Embodiment 1 or 2, for example, in a weight percentage of 100% (100% by weight) relative to the whole solid electrolyte layer, except for impurities due to inevitable entry.

This feature provides further improved charge/discharge characteristics of the battery.

As described above, the solid electrolyte layer may be composed only of the solid electrolyte material according to Embodiment 1 or 2.

Alternatively, the solid electrolyte layer may be composed only of a solid electrolyte material different from the solid electrolyte material according to Embodiment 1 or 2. Examples of the solid electrolyte material different from the solid electrolyte material according to Embodiment 1 or 2 include $Li_2MgX4$, $Li_2FeX_4$, $Li(Al, Ga, In)X_4$, $Li_3(Al, Ga, In)X_6$, and LiI (X: F, Cl, Br, I).

The solid electrolyte layer may simultaneously include the solid electrolyte material according to Embodiment 1 or 2, and the above-described solid electrolyte material different from the solid electrolyte material according to Embodiment 1 or 2. In this case, both materials may be uniformly diffused. A layer composed of the solid electrolyte material according to Embodiment 1 or 2 and a layer composed of the above-described solid electrolyte material different from the solid electrolyte material according to Embodiment 1 or 2 may be sequentially disposed in the layer-stacking direction of the battery.

The solid electrolyte layer may have a thickness of 1 μm or more and 1000 μm or less. When the solid electrolyte layer has a thickness of less than 1 μm, the positive electrode 201 and the negative electrode 203 have a higher probability of short-circuit therebetween. When the solid electrolyte layer has a thickness of more than 1000 μm, operation at a high power may be difficult.

The negative electrode 203 includes a material having a property of storing and releasing metal ions (such as lithium ions). The negative electrode 203 includes, for example, a negative electrode active material (such as negative electrode active material particles 205).

Examples of the negative electrode active material include metal materials, carbon materials, oxides, nitrides, tin compounds, and silicon compounds. Such a metal material may be a single metal. Alternatively, the metal material may be an alloy. Examples of the metal material include metallic lithium and lithium alloys. Examples of the carbon materials include natural graphite, coke, partially graphitized carbon, carbon fiber, spherical carbon, artificial graphite, and amorphous carbon. From the viewpoint of capacity density, silicon (Si), tin (Sn), silicon compounds, and tin compounds are preferably used. In the case of using a negative electrode active material having a low average reaction voltage, the solid electrolyte material according to Embodiment 1 or 2 exerts more strongly the effect of suppressing electrolysis.

The negative electrode active material particles 205 may have a median diameter of 0.1 μm or more and 100 μm or less. When the negative electrode active material particles 205 have a median diameter of less than 0.1 μm, in the negative electrode, the negative electrode active material particles 205 and the solid electrolyte particles 100 may not form a good diffusion state. This results in degradation of the charge/discharge characteristics of the battery. When the negative electrode active material particles 205 have a median diameter of more than 100 μm, lithium diffuses slowly in the negative electrode active material particles 205. This may make it difficult for the battery to operate at a high power.

The negative electrode active material particles 205 may have a median diameter larger than the median diameter of the solid electrolyte particles 100. In this case, a good diffusion state of the negative electrode active material particles 205 and the halide solid electrolyte material is formed.

The volume ratio "v:100−v" of the negative electrode active material particles 205 and the solid electrolyte particles 100 included in the negative electrode 203 may satisfy 30≤v≤95. When v<30, it may be difficult to ensure a sufficient energy density of the battery. When v>95, operation at a high power may be difficult.

The negative electrode 203 may have a thickness of 10 μm or more and 500 μm or less. When the negative electrode has a thickness of less than 10 μm, it may be difficult to ensure a sufficient energy density of the battery. When the negative electrode has a thickness of more than 500 μm, operation at a high power may be difficult.

At least one of the positive electrode 201, the electrolyte layer 202, and the negative electrode 203 may include, for the purpose of increasing the ion conductivity or improving the chemical stability and electrochemical stability, a sulfide solid electrolyte or an oxide solid electrolyte. Examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. Examples of the oxide solid electrolyte include NASICON solid electrolytes represented by $LiTi_2(PO_4)_3$ and element-substitution products thereof, (LaLi)$TiO_3$-based perovskite solid electrolytes, LISICON solid electrolytes represented by $Li_{14}ZnGe_4O_{16}$, $Li_4SiO_4$, $LiGeO_4$, and element-substitution products thereof, garnet solid electrolytes represented by $Li_7La_3Zr_2O_{12}$ and element-substitution products thereof, $Li_3N$ and H-substitution products thereof, and $Li_3PO_4$ and N-substitution products thereof.

At least one of the positive electrode 201, the electrolyte layer 202, and the negative electrode 203 may include, for the purpose of increasing the ion conductivity, an organic polymer solid electrolyte. The organic polymer solid electrolyte may be, for example, a compound of a polymer and a lithium salt. The polymer may have an ethylene oxide structure. The presence of the ethylene oxide structure enables a high lithium salt content, which provides further increased ion conductivity. Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. As the lithium salt, a single lithium salt selected from these may be used alone. Alternatively, as the lithium salt, a mixture of two or more lithium salts selected from these may be used.

At least one of the positive electrode 201, the electrolyte layer 202, and the negative electrode 203 may include, for the purpose of facilitating exchange of lithium ions and improving the power characteristics of the battery, a non-aqueous electrolyte solution, a gel electrolyte, or an ionic liquid.

The non-aqueous electrolyte solution includes a non-aqueous solvent and a lithium salt dissolved in the non-aqueous solvent. Examples of the non-aqueous solvent include a cyclic carbonic acid ester solvent, a chain carbonic acid ester solvent, a cyclic ether solvent, a chain ether solvent, a cyclic ester solvent, a chain ester solvent, and a fluorocarbon solvent. Examples of the cyclic carbonic acid ester solvent include ethylene carbonate, propylene carbonate, and butylene carbonate. Examples of the chain carbonic acid ester solvent include dimethyl carbonate, ethyl methyl carbonate, and diethyl carbonate. Examples of the cyclic ether solvent include tetrahydrofuran, 1,4-dioxane, and 1,3-dioxolane. Examples of the chain ether solvent include 1,2-dimethoxyethane and 1,2-diethoxyethane. Examples of the cyclic ester solvent include γ-butyrolactone. Examples of the chain ester solvent include methyl acetate. Examples of the fluorocarbon solvent include fluoroethylene carbonate, methyl fluoropropionate, fluorobenzene, fluoroethyl methyl carbonate, and fluorodimethylene carbonate. As the non-aqueous solvent, a single non-aqueous solvent selected from these may be used alone. Alternatively, as the non-aqueous solvent, two or more non-aqueous solvents selected from these may be used in combination. The non-aqueous electrolyte solution may include at least one fluorocarbon solvent selected from the group consisting of fluoroethylene carbonate, methyl fluoropropionate, fluorobenzene, fluoroethyl methyl carbonate, and fluorodimethylene carbonate. Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(S_2C_4F_9)$, and $LiC(SO_2CF_3)_3$. As the lithium salt, a single lithium salt selected from these may be used alone. Alternatively, as the lithium salt, a mixture of two or more lithium salts selected from these may be used. The concentration of the lithium salt is, for example, in the range of 0.5 to 2 mol/l.

The gel electrolyte may be a polymer material prepared so as to contain a non-aqueous electrolyte solution. Examples of the polymer material include polyethylene oxide, polyacrylonitrile, polyvinylidene fluoride, polymethyl methacrylate, and polymers having ethylene oxide bonds.

Examples of the cation constituting the ionic liquid include aliphatic chain quaternary salts such as tetraalkyl ammonium and tetraalkyl phosphonium; aliphatic cyclic ammoniums such as pyrrolidiniums, morpholiniums, imidazoliniums, tetrahydropyrimidiniums, piperaziniums, and piperidiniums; and nitrogen-containing heterocyclic aromatic cations such as pyridiniums and imidazoliums. Examples of the anion constituting the ionic liquid include $PF_6^-$, $BF_4^-$, $SbF_4^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$. The ionic liquid may contain lithium salt.

At least one of the positive electrode 201, the electrolyte layer 202, and the negative electrode 203 may include, for the purpose of improving adhesion between particles, a binder. The binder is used in order to improve the binding property of the material constituting an electrode. Examples of the binder include polyvinylidene fluoride, polytetrafluoroethylene, polyethylene, polypropylene, aramid resin, polyamide, polyimide, polyamide-imide, polyacrylonitrile, polyacrylic acid, methyl polyacrylate ester, ethyl polyacrylate ester, hexyl polyacrylate ester, polymethacrylic acid, methyl polymethacrylate ester, ethyl polymethacrylate ester, hexyl polymethacrylate ester, polyvinyl acetate, polyvinylpyrrolidone, polyether, polyethersulfone, hexafluoropolypropylene, styrene-butadiene rubber, and carboxymethylcellulose. The binder may be a copolymer of two or more materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. Alternatively, two or more selected from these may be mixed and used as the binder.

At least one of the positive electrode 201 and the negative electrode 203 may include a conductive agent as needed.

The conductive agent is used in order to reduce the electrode resistance. Examples of the conductive agent include graphites such as natural graphite and artificial graphite; carbon blacks such as acetylene black and Ketjen black; conductive fibers such as carbon fiber and metal fiber; carbon fluoride; powders of metals such as aluminum; conductive whiskers such as zinc oxide and potassium titanate; conductive metal oxides such as titanium oxide; and conductive polymers such as polyaniline, polypyrrole, and polythiophene. Use of, as the conductive agent, such a carbon conductive agent achieves a reduction in the costs.

Incidentally, the battery according to Embodiment 2 may be provided as batteries having various shapes such as a coin shape, a cylindrical shape, a prismatic shape, a sheet shape, a button shape, a flat shape, and a stacked layer shape.

EXAMPLES

Hereinafter, the present disclosure will be described in detail with reference to Examples and Comparative Examples.

Example A1

Production of Solid Electrolyte Material

In an argon atmosphere at a dew point of −60° C. or less, raw material powders LiCl, $YCl_3$, and $ZrCl_4$ were weighed so as to have a molar ratio of $LiCl:YCl_3:ZrCl_4=2.5:0.5:0.5$, and then subjected to milling processing using a planetary ball mill for 12 hours at 600 rpm.

Evaluation of Lithium-Ion Conductivity

Figure 2:
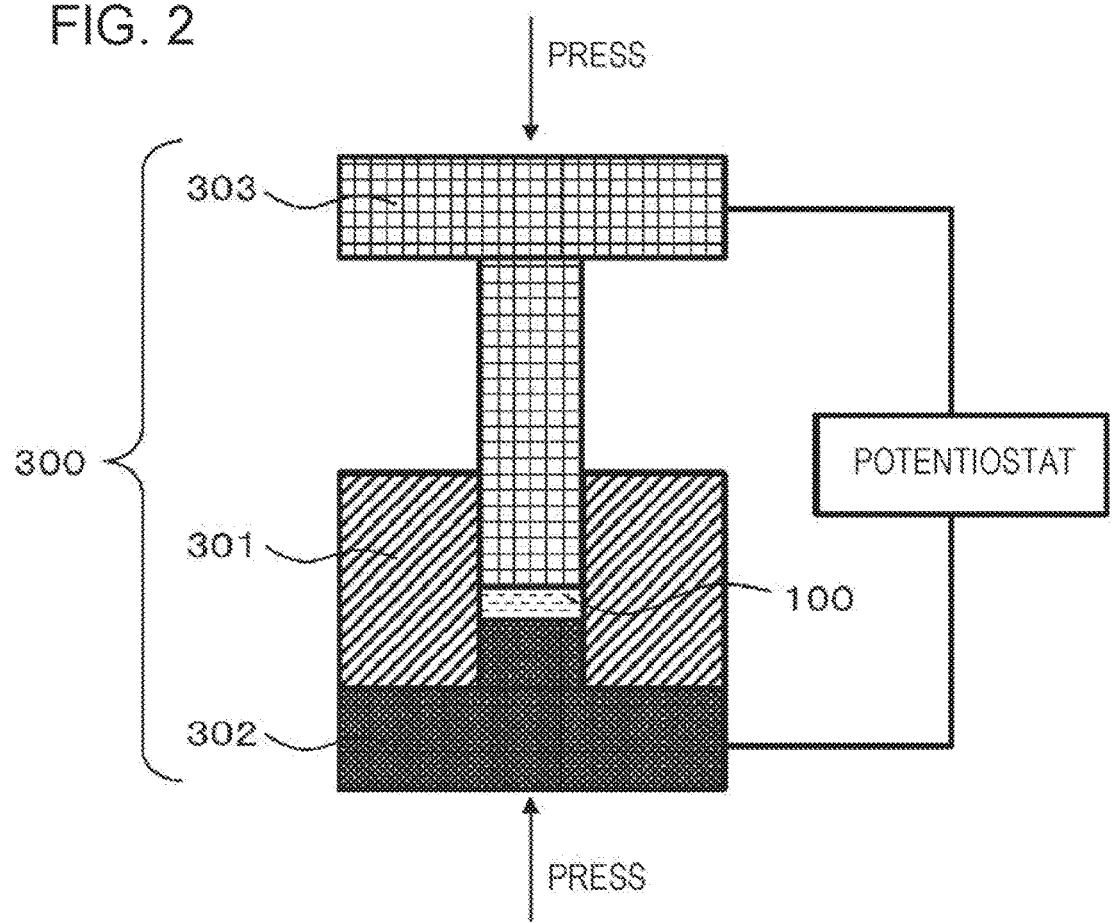
FIG. 2 is a schematic view illustrating a method of evaluating ion conductivity.

FIG. 2 is a schematic view illustrating a method of evaluating lithium-ion conductivity.

A pressing die 300 is constituted by a die 301, which is electronically insulating and composed of polycarbonate, and an upper punch 303 and a lower punch 302, which are electron conductive and composed of stainless steel.

The structure illustrated in FIG. 2 was used to evaluate ion conductivity by the following method.

In a dry atmosphere at a dew point of −30° C. or less, the powder of the solid electrolyte material of Example A1 was charged into the pressing die 300, and uniaxially pressed at 400 MPa, to prepare a conductivity measurement cell of Example A1.

In the pressed state, lead wires from the upper punch 303 and the lower punch 302 were connected to a potentiostat (VersaSTAT 4 from Princeton Applied Research) equipped with a frequency response analyzer; the electrochemical impedance measurement method was performed to measure ion conductivity at room temperature.

Figure 3:
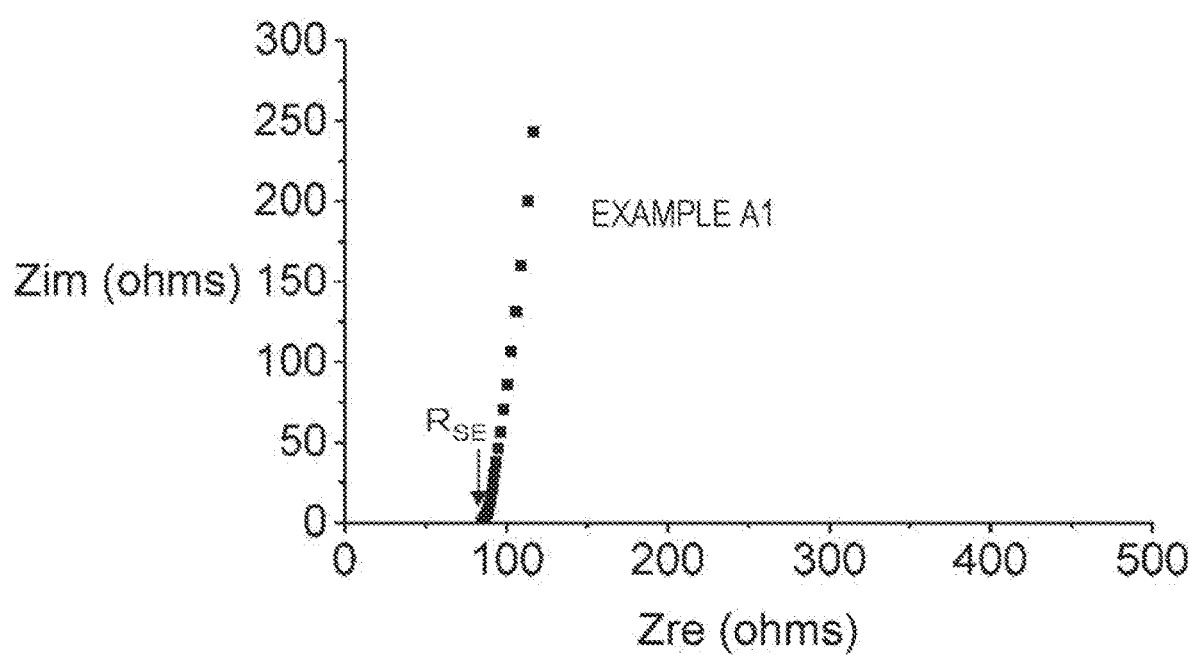
FIG. 3 is a graph illustrating evaluation results of ion conductivity provided by AC impedance measurement.

The Cole-Cole plot based on the measurement results of impedance is illustrated in FIG. 3.

In FIG. 3, at a measurement point (arrow in FIG. 3) of the minimum absolute value of the phase of complex impedance, the real part of the impedance was regarded as the resistance (to ion conduction) of the solid electrolyte of Example A1.

From the resistance of the electrolyte, ion conductivity was calculated by the following formula.

$$\sigma = (R_{SE} \times S/t)^{-1}$$

where σ represents ion conductivity; S represents the area of the electrolyte (in FIG. 2, the inner diameter of the die 301); $R_{SE}$ represents the resistance of the solid electrolyte determined by the above-described impedance measurement; and t represents the thickness of the electrolyte (in FIG. 2, the thickness of the compact of the plurality of solid electrolyte particles 100).

The solid electrolyte material of Example A1 was found to have an ion conductivity at 22° C. of $1.2 \times 10^{-3}$ S/cm.

Analysis of Crystal Structure

Figure 4A:
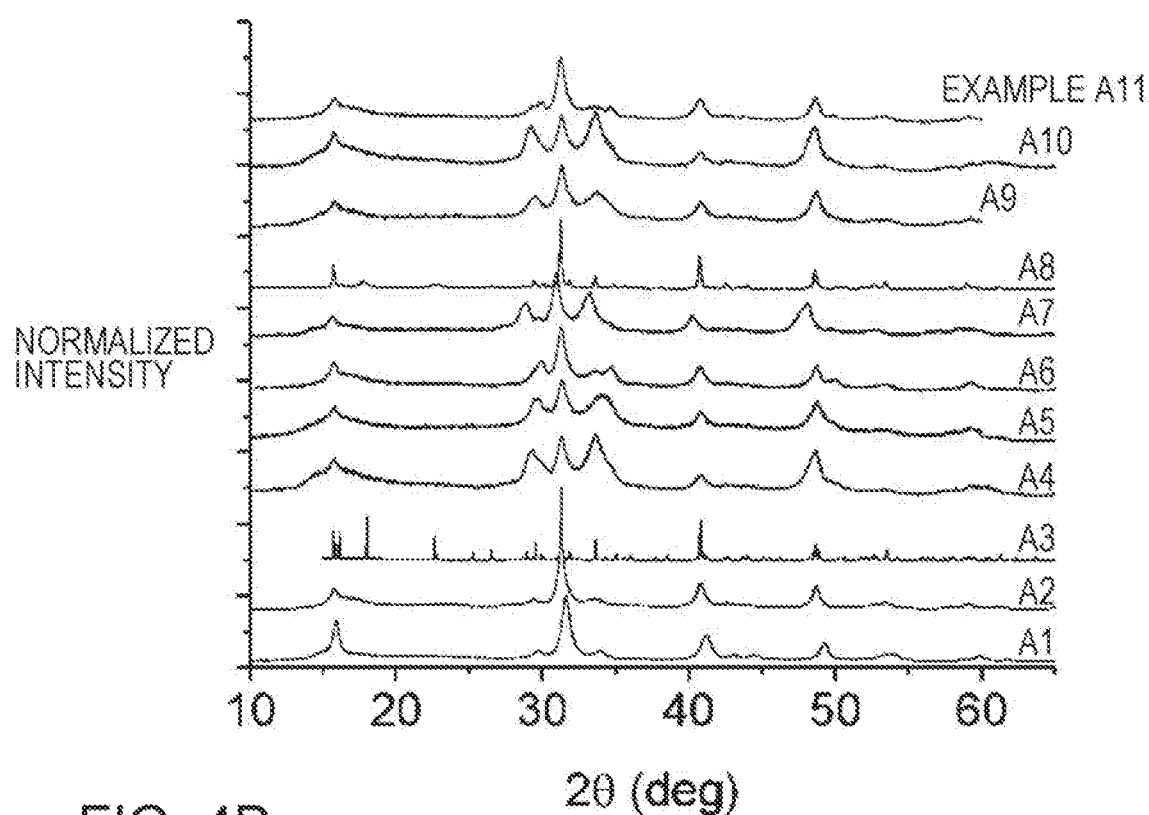
FIG. 4A is a graph illustrating XRD patterns in Examples A1-A11.

FIG. 4A is a graph illustrating XRD patterns.

The results in FIG. 4A were measured by the following method.

In order to analyze the crystal structure of the solid electrolyte, an X-ray diffractometer (MiniFlex 600 from Rigaku Corporation) was used to measure the X-ray diffraction pattern in a dry environment at a dew point of −45° C. or less. As the X-ray source, Cu-Kα radiation was used.

Figure 4B:
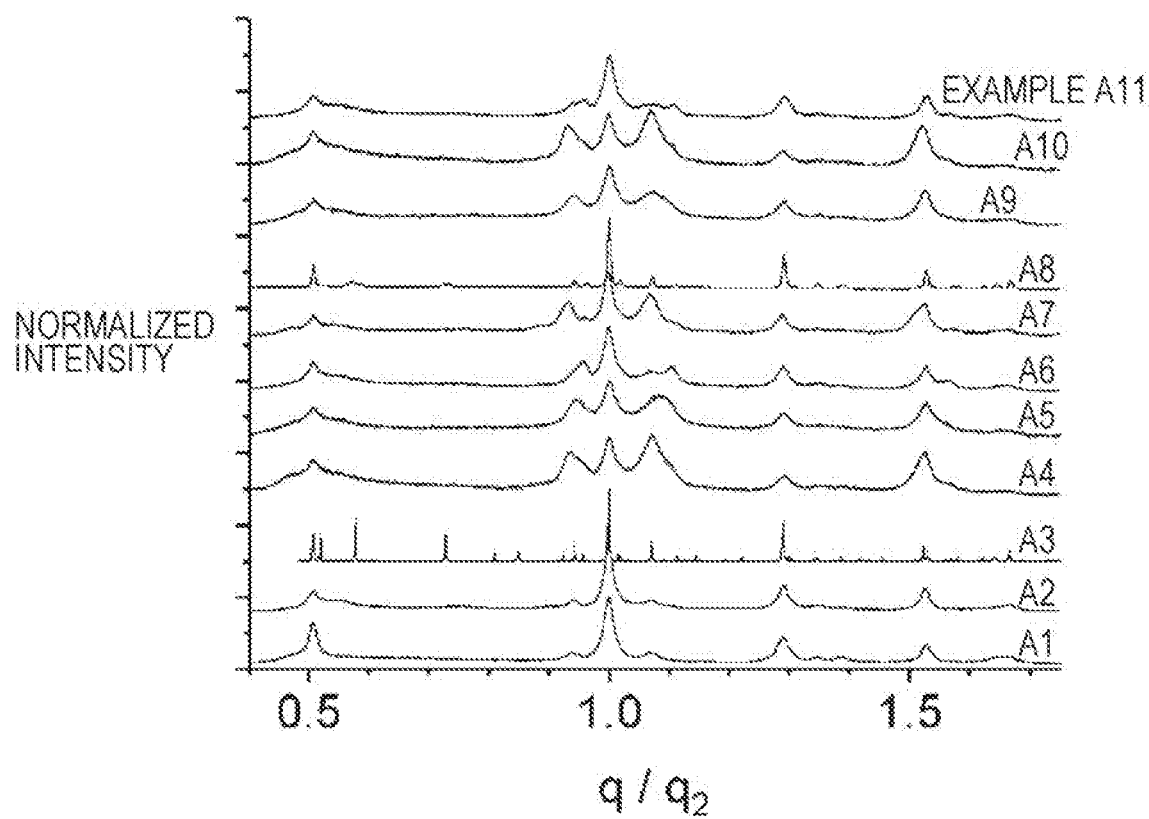
FIG. 4B is a graph illustrating XRD patterns in Examples A1-A11.

FIG. 4B illustrates a diffraction pattern obtained by converting the abscissa axis 2θ of the above-described XRD pattern into q=4π sin(θ)/λ and normalized using a value of q at the peak position 2θ=31.64°, namely, $q_2$=2.222 Å$^{-1}$, so that the abscissa axis represents q/$q_2$. In FIG. 4B, peaks were observed at positions of q/$q_2$=0.507, 1.289, and 1.530. From the values of q at these peaks that are $q_1$/$q_2$=0.507, $q_3$/$q_2$=1.289, and $q_4$/$q_2$=1.530, $a_{ave}$ was calculated by Formula (2) and found to be 5.232 Å. From $x_{Cl}$=1, $x_{Br}$=0, and $x_I$=0, $a_{LiX}$ was calculated by Formula (3); $a_{ave}/a_{LiX}$ was calculated and found to be $a_{ave}/a_{LiX}$=1.020.

Production of Secondary Battery

In an argon glove box, the solid electrolyte material of Example A1 and LiCoO$_2$ serving as an active material were weighed in a volume ratio of 70:30. These were mixed in an agate mortar, to prepare a mixture.

In an insulating outer cylinder, the solid electrolyte material of Example A1 in an amount corresponding to a thickness of 700 μm, 8.5 mg of the above-described mixture, and 16.5 mg of Al powder were stacked in this order. This stack was pressed at a pressure of 300 MPa, to obtain a first electrode and a solid electrolyte layer.

Subsequently, metal In (thickness: 200 μm) was disposed on a side of the solid electrolyte layer opposite from a side in contact with the first electrode. This stack was pressed at a pressure of 80 MPa, to prepare a stack constituted by the first electrode, the solid electrolyte layer, and a second electrode.

Subsequently, the stack was made to be overlain by and underlain by stainless steel current collectors, and current collection leads were attached to the current collectors.

Finally, an insulating ferrule was used to isolate and seal the inside of the insulating outer cylinder from the outer atmosphere.

In this way, the secondary battery of Example A1 was produced.

Charge/Discharge Test

The charge/discharge test of the secondary battery of Example A1 was performed in the following manner.

The secondary battery of Example A1 was placed in a thermostatic chamber at 25° C.

The battery was subjected to constant current charging at a current corresponding to 0.05 C rate (20 hour rate) relative to the theoretical capacity of the battery. The charging was terminated at a voltage of 3.6 V.

Subsequently, discharging was performed also at a current corresponding to 0.05 C rate. The discharging was terminated at a voltage of 1.9 V.

As a result of the measurement, the initial discharge capacity of the secondary battery of Example A1 was found to be 0.467 mAh.

Examples A2 to A11

Hereinafter, synthesis and evaluation methods in Examples A2 to A11 will be described.

Production of Solid Electrolyte Materials

In Examples A2 to A11, within a glove box having a dry and low-oxygen-content atmosphere maintained at a dew point of −60° C. or less and an oxygen content of 5 ppm or less, raw material powders were weighed so as to have predetermined compositions. The compositions of solid electrolytes produced in Examples A2 to A11 are described later in Table 1. For example, when such a composition was Li$_a$Y$_b$M$_c$Cl$_d$, the weighing and mixing were performed in a ratio of LiCl:YCl$_3$:MCl$_m$=a:b:c where M represents a metallic element and m represents the valence of M. Subsequently, a planetary ball mill was used to perform milling processing for 12 hours at 600 rpm. In Examples A3 and A8, heat treatment was respectively performed at 500° C. and 300° C. for 5 hours.

Evaluation of Ion Conductivity

In a glove box having a dry and low-oxygen-content atmosphere maintained at a dew point of −90° C. or less and an oxygen content of 5 ppm or less, the same method as in Example A1 above was performed to prepare conductivity measurement cells of Examples A2 to A11.

Except for this, the same method as in Example A1 above was performed to measure ion conductivity.

Such ion conductivities of Examples A2 to A11 are described later in Table 1.

Analysis of Crystal Structures

The same method as in Example A1 above was performed to measure the crystal structure of each of the solid electrolyte materials of Examples A2 to A11.

The X-ray diffraction patterns of Examples A1 to A11 are illustrated in FIG. 4A.

As in Example A1, the abscissa axis 2θ of such an X-ray diffraction pattern in FIG. 4A was converted into q=4π sin(θ)/λ and further normalized using $q_2$, which is a value of q at a peak having a high intensity in the range of q=2.11 Å$^{-1}$ to 2.31 Å$^{-1}$. The resultant diffraction pattern in which the abscissa axis represents values of q/$q_2$ is illustrated in FIG. 4B.

Peaks were observed in ranges of q/$q_2$ of 0.50 to 0.52, 1.28 to 1.30, and 1.51 to 1.54. The values of q/$q_2$ at these peaks and the value of $q_2$ are described later in Table 1. From these values, $a_{ave}$ was calculated by Formula (2); Formula (3) was used and $a_{ave}/a_{LiX}$ was calculated. The calculation results are described later in Table 1.

However, in Example A3, $q_1$, $q_2$, $q_3$, and $q_4$ were each determined from weighted average calculated using weights of intensities of proximate peaks. Specifically, $q_1$ was calculated using the weighted average of peaks at q=1.117 and 1.122; $q_2$ was calculated using the weighted average of peaks at q=2.195 and 2.202; $q_3$, was calculated using the weighted average of peaks at q=2.838 and 2.844; and $q_4$ was calculated using the weighted average of peaks at q=3.355 and 3.369.

Production of Secondary Batteries

In a glove box having a dry and low-oxygen-content atmosphere maintained at a dew point of −90° C. or less and an oxygen content of 5 ppm or less, each of the solid electrolyte materials of Examples A2 to A11 and LiCoO$_2$ serving as a positive electrode active material were weighed in a volume ratio of 30:70. These were mixed in an agate mortar. Thus, positive electrode mixtures of Examples A2 to A11 were prepared.

Except for these, the same method as in Example A1 above was performed to produce secondary batteries of Examples A2 to A11.

Charge/Discharge Test

The same method as in Example A1 above was performed to subject the secondary batteries of Examples A2 to A11 to the charge/discharge test. The initial discharge characteristics of Examples A2 to A11 were similar to those of Example A1, and good charge/discharge characteristics were obtained. The initial discharge characteristics in Example A2 are illustrated in FIG. 5. The discharge capacity of Example A2 was found to be 0.657 mAh.

Examples B1 to B13

Hereinafter, synthesis and evaluation methods in Examples B1 to B13 will be described.
Production of Solid Electrolyte Materials In Examples B1 to B13, within a glove box having a dry and low-oxygen-content atmosphere maintained at a dew point of −60° C. or less and an oxygen content of 5 ppm or less, raw material powders were weighed. The compositions of solid electrolytes produced in Examples B1 to B13 are described later in Table 2.

For example, when such a composition was $Li_aY_bM_cBr_d$, the weighing and mixing were performed in a ratio of $LiBr:YBr_3:MBr_m$=a:b:c where M represents a metallic element and m represents the valence of M. Subsequently, a planetary ball mill was used to perform milling processing for 12 hours at 600 rpm. In Example B8, subsequently, heat treatment was performed at 300° C. for 5 hours.

Except for these, the same method as in Example A1 above was performed to produce solid electrolyte materials of Examples B1 to B13.
Analysis of Crystal Structures The same method as in Example A1 above was performed to measure the crystal structure of each of the solid electrolyte materials of Examples B1 to B13.

Figure 6A:
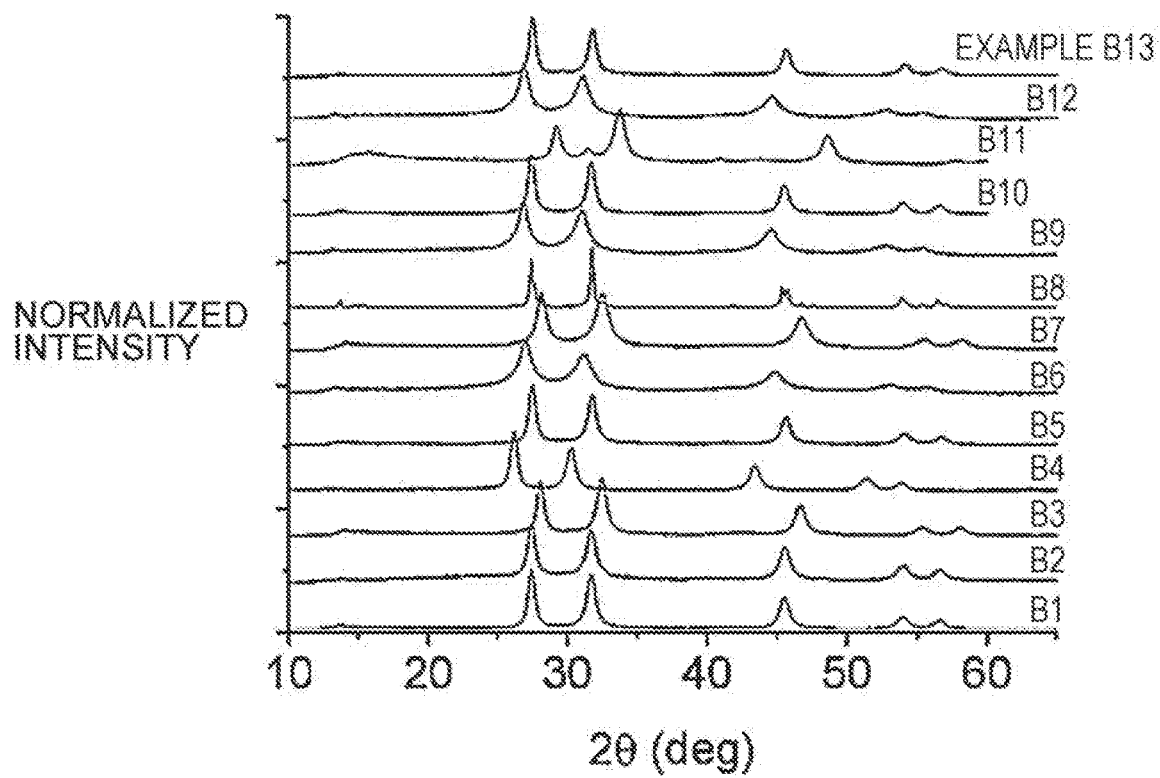
FIG. 6A is a graph illustrating XRD patterns in Examples B1-B13.

The X-ray diffraction patterns of Examples B1 to B13 are illustrated in FIG. 6A.

Figure 6B:
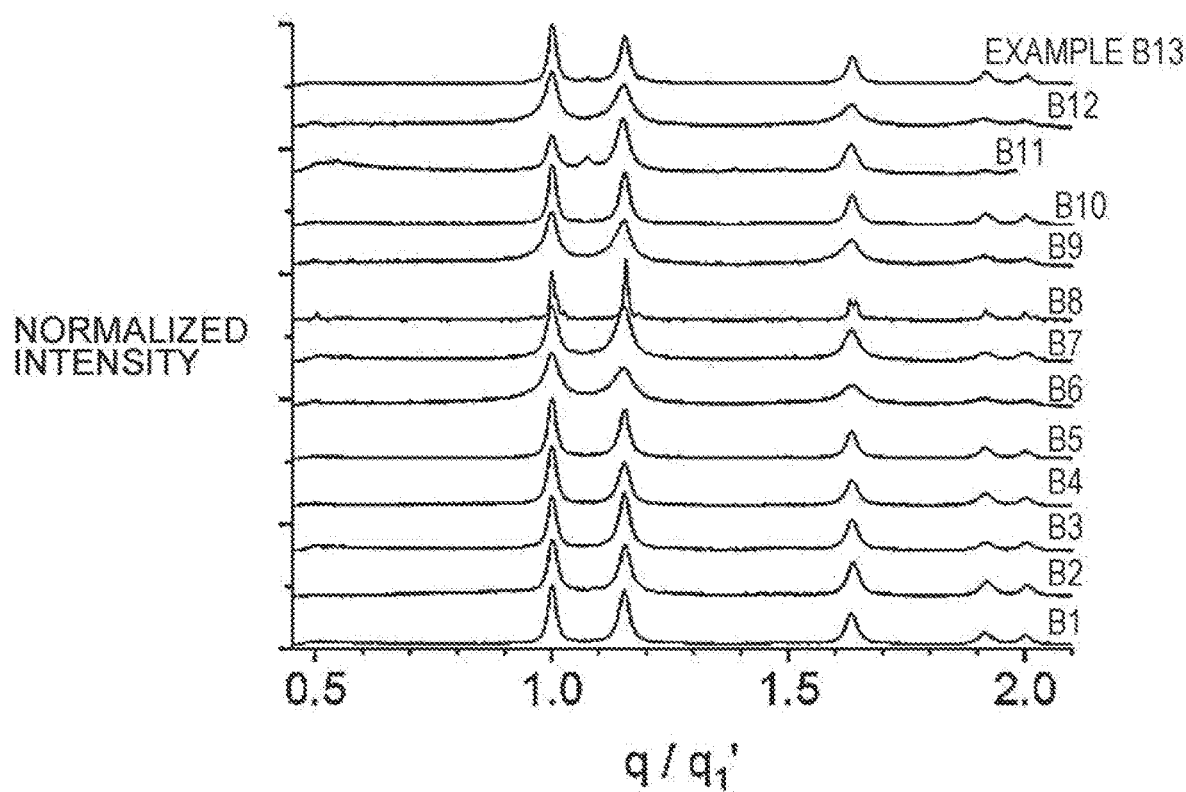
FIG. 6B is a graph illustrating XRD patterns in Examples B1-B13.

The abscissa axis 2θ of such an X-ray diffraction pattern in FIG. 6A was converted into q=4π sin(θ)/λ and further normalized using $q_1'$, which is a value of q at a peak having a high intensity in the range of q=1.76 Å$^{-1}$ to 2.18 Å$^{-1}$. The resultant diffraction pattern in which the abscissa axis represents values of $q/q_1'$ is illustrated in FIG. 6B.

Peaks were observed in ranges of $q/q_1'$ of 1.14 to 1.17, 1.62 to 1.65, 1.88 to 1.94, and 1.9 to 2.1. The values of $q/q_1'$ at these peaks and the value of $q_1'$ are described later in Table 2. From these values, $a_{ave}$ was calculated by Formula (4); Formula (3) was used and $a_{ave}/a_{LiX}$ was calculated. The calculation results are described later in Table 2.
Evaluation of Ion Conductivity In a glove box having a dry and low-oxygen-content atmosphere maintained at a dew point of −90° C. or less and an oxygen content of 5 ppm or less, the same method as in Example A1 above was performed to prepare conductivity measurement cells of Examples B1 to B13.

Except for this, the same method as in Example A1 above was performed to measure ion conductivity.

Such ion conductivities of Examples B1 to B13 are described later in Table 2.
Production of Secondary Batteries In a glove box having a dry and low-oxygen-content atmosphere maintained at a dew point of −90° C. or less and an oxygen content of 5 ppm or less, each of the solid electrolyte materials of Examples B1 to B13 and $LiCoO_2$ serving as a positive electrode active material were weighed in a volume ratio of 30:70. These were mixed in an agate mortar. Thus, positive electrode mixtures of Examples B1 to B13 were prepared.

Except for these, the same method as in Example A1 above was performed to produce secondary batteries of Examples B1 to B13.
Charge/Discharge Test The same method as in Example A1 above was performed to subject the secondary batteries of Examples B1 to B13 to the charge/discharge test. The initial discharge characteristics of Examples B1 to B13 were similar to those of Example A1, and good charge/discharge characteristics were obtained.

Comparative Examples 1 to 3

Hereinafter, synthesis and evaluation methods in Comparative Examples 1 to 3 will be described.
Production of Solid Electrolyte Materials In Comparative Examples 1 to 3, within a glove box having a dry and low-oxygen-content atmosphere maintained at a dew point of −60° C. or less and an oxygen content of 5 ppm or less, raw material powders were weighed. The compositions of solid electrolytes produced in Comparative Examples 1 to 3 are described later in Table 3. In Comparative Example 3, subsequently, heat treatment was performed at 200° C. for 1 hour.

Except for these, the same method as in Example A1 above was performed to produce solid electrolyte materials of Comparative Examples 1 to 3.
Analysis of Crystal Structures The same method as in Example A1 above was performed to measure the crystal structure of each of the solid electrolyte materials of Comparative Examples 1 to 3.

Figure 7A:
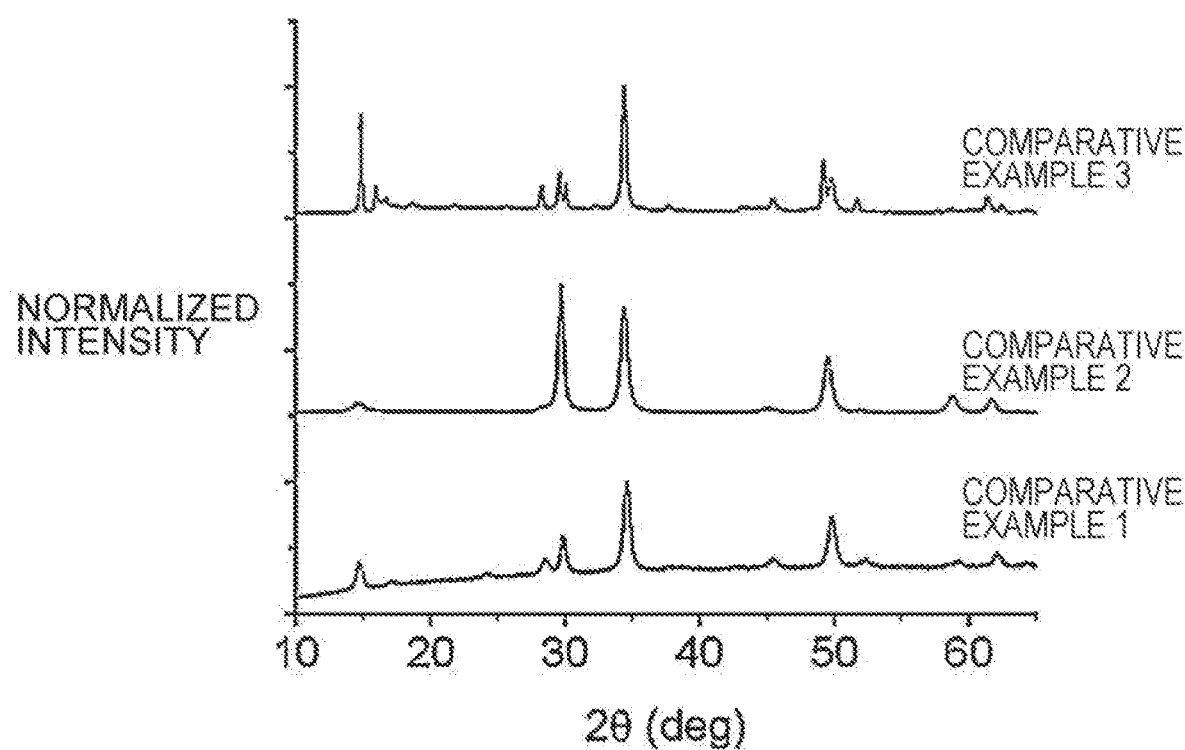
FIG. 7A is a graph illustrating XRD patterns in Comparative Examples 1-3.

The X-ray diffraction patterns of Comparative Examples 1 to 3 are illustrated in FIG. 7A.

Figure 7B:
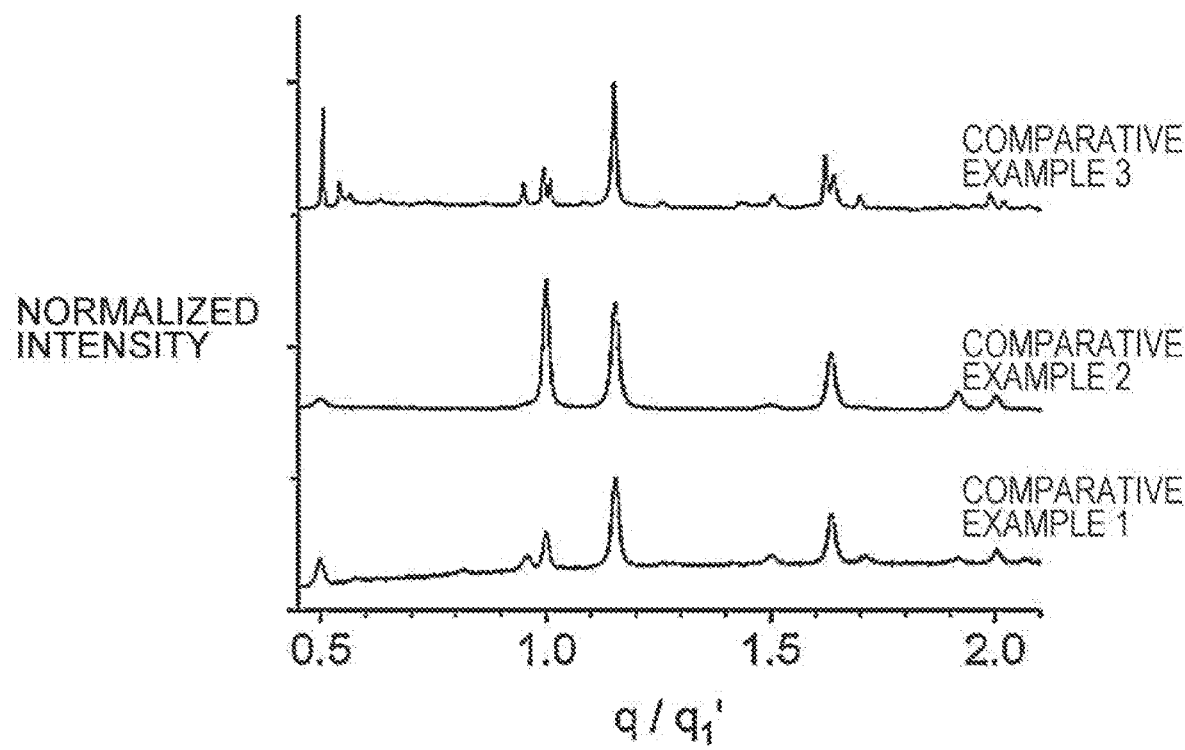
FIG. 7B is a graph illustrating XRD patterns in Comparative Examples 1-3.

As in Example B1, the abscissa axis 2θ of such an X-ray diffraction pattern in FIG. 7A was converted into q=4π sin(θ)/λ and further normalized using $q_1'$, which is a value of q at a peak having a high intensity in the range of q=1.76 Å$^{-1}$ to 2.18 Å$^{-1}$. The resultant diffraction pattern in which the abscissa axis represents values of $q/q_1'$ is illustrated in FIG. 7B.

Peaks were observed in ranges of $q/q_1'$ of 1.14 to 1.17, 1.62 to 1.65, 1.88 to 1.94, and 1.9 to 2.1. The values of $q/q_1'$ at these peaks and the value of $q_1'$ are described later in Table 3. From these values, $a_{ave}$ was calculated by Formula (4); Formula (3) was used and $a_{ave}/a_{LiX}$ was calculated. The calculation results are described later in Table 3.

However, in Comparative Example 3, $q_1'$ and $q_3'$ were determined from weighted average calculated using weights of intensities of proximate peaks. Specifically, $q_1'$ was calculated using the weighted average of peaks at q=2.078 and 2.109; and $q_3'$ was calculated using the weighted average of peaks at q=3.389 and 3.429.
Evaluation of Ion Conductivity In a glove box having a dry and low-oxygen-content atmosphere maintained at a dew point of −90° C. or less and an oxygen content of 5 ppm or less, the same method as in Example A1 above was performed to prepare conductivity measurement cells of Comparative Examples 1 to 3.

Except for this, the same method as in Example A1 above was performed to measure ion conductivity.

Such ion conductivities of Comparative Examples 1 to 3 are described later in Table 3.
Production of Secondary Battery In a glove box having a dry and low-oxygen-content atmosphere maintained at a dew point of −90° C. or less and an oxygen content of 5 ppm or less, the solid electrolyte material of Comparative Example 2, and $LiCoO_2$ serving as a positive electrode active material were weighed in a volume ratio of 30:70. These were mixed in an agate mortar. Thus, the positive electrode mixture of Comparative Example 2 was prepared.

Except for these, the same method as in Example A1 above was performed to produce the secondary battery of Comparative Example 2.

Charge/Discharge Test

The same method as in Example A1 above was performed to subject the secondary battery of Comparative Example 2 to the charge/discharge test. Regarding initial discharge characteristics of Comparative Example 2, the battery substantially did not discharge and did not operate.

The compositions and evaluation results of Examples A1 to A11 and B1 to B13 and Comparative Examples 1 to 3 are described in Tables 1 to 3.

TABLE 1

| Example | Composition | Conductivity (S/cm) | $q_2$ | $q_1/q_2$ | $q_3/q_2$ | $q_4/q_2$ | $a_{ave}$ | $a_{ave}/a_{LiX}$ |
|---|---|---|---|---|---|---|---|---|
| Example A1 | $Li_{2.5}Y_{0.5}Zr_{0.5}Cl_6$ | 1.2E−03 | 2.222 | 0.507 | 1.289 | 1.530 | 5.232 | 1.020 |
| Example A2 | $Li_{2.7}Y_{1.1}Cl_6$ | 5.0E−04 | 2.200 | 0.509 | 1.291 | 1.528 | 5.280 | 1.029 |
| Example A3 | $Li_{2.85}Y_{1.05}Cl_6$ | 1.5E−04 | 2.200 | 0.509 | 1.293 | 1.527 | 5.280 | 1.029 |
| Example A4 | $Li_{3.1}Y_{0.9}Mg_{0.1}Cl_6$ | 2.8E−04 | 2.199 | 0.508 | 1.292 | 1.526 | 5.287 | 1.031 |
| Example A5 | $Li_{2.8}Y_{0.9}Ta_{0.1}Cl_6$ | 5.0E−04 | 2.196 | 0.510 | 1.293 | 1.530 | 5.286 | 1.030 |
| Example A6 | $Li_{3.1}Y_{0.9}Sr_{0.1}Cl_6$ | 2.4E−04 | 2.201 | 0.506 | 1.294 | 1.527 | 5.282 | 1.030 |
| Example A7 | $Li_3YCl_5Br$ | 6.0E−04 | 2.178 | 0.508 | 1.287 | 1.525 | 5.344 | 1.029 |
| Example A8 | $Li_{2.8}Y_{1.0}Ca_{0.1}Cl_6$ | 1.3E−04 | 2.222 | 0.509 | 1.291 | 1.528 | 5.229 | 1.019 |
| Example A9 | $Li_{2.9}Y_{0.95}Nb_{0.05}Cl_6$ | 5.0E−04 | 2.200 | 0.510 | 1.294 | 1.529 | 5.275 | 1.028 |
| Example A10 | $Li_{3.1}Y_{0.9}Zn_{0.1}Cl_6$ | 2.8E−04 | 2.196 | 0.509 | 1.292 | 1.528 | 5.290 | 1.031 |
| Example A11 | $Li_3Y_{0.9}Al_{0.1}Cl_6$ | 5.0E−04 | 2.218 | 0.509 | 1.292 | 1.530 | 5.235 | 1.021 |

TABLE 2

| Example | Composition | Conductivity (S/cm) | $q_1'$ | $q_2'/q_1'$ | $q_3'/q_1'$ | $q_4'/q_1'$ | $q_5'/q_1'$ | $a_{ave}$ | $a_{ave}/a_{LiX}$ |
|---|---|---|---|---|---|---|---|---|---|
| Example B1 | $Li_{2.85}Y_{1.05}Br_6$ | 7.10E−04 | 1.93 | 1.154 | 1.633 | 1.918 | 2.002 | 5.635 | 1.025 |
| Example B2 | $Li_3Y_{0.9}La_{0.1}Br_6$ | 5.5E−04 | 1.928 | 1.156 | 1.639 | 1.920 | 2.006 | 5.635 | 1.024 |
| Example B3 | $Li_3YCl_3Br_3$ | 9.50E−04 | 1.975 | 1.154 | 1.635 | 1.920 | 2.004 | 5.506 | 1.036 |
| Example B4 | $Li_3YBr_3I_3$ | 1.00E−03 | 1.845 | 1.156 | 1.636 | 1.916 | 2.001 | 5.895 | 1.023 |
| Example B5 | $Li_{3.1}Y_{0.9}Ba_{0.1}Br_6$ | 4.2E−04 | 1.931 | 1.157 | 1.629 | 1.917 | 1.915 | 5.686 | 1.034 |
| Example B6 | $Li_{2.8}Y_{0.9}Ta_{0.1}Cl_2Br_2I_2$ | 1.8E−03 | 1.901 | 1.153 | 1.636 | 1.915 | 2.003 | 5.722 | 1.031 |
| Example B7 | $Li_{2.9}Y_{0.95}Nb_{0.05}Cl_3Br_3$ | 7.2E−04 | 1.980 | 1.153 | 1.635 | 1.916 | 2.003 | 5.495 | 1.034 |
| Example B8 | $Li_{3.05}Y_{0.95}Ca_{0.05}Br_6$ | 1.6E−03 | 1.928 | 1.158 | 1.631 | 1.918 | 1.999 | 5.643 | 1.026 |
| Example B9 | $Li_3Y_{0.9}Sm_{0.1}Cl_2Br_2I_2$ | 3.0E−03 | 1.893 | 1.154 | 1.633 | 1.913 | 2.005 | 5.748 | 1.035 |
| Example B10 | $Li_3Y_{0.95}Bi_{0.05}Br_6$ | 6.2E−04 | 1.929 | 1.155 | 1.636 | 1.920 | 2.003 | 5.635 | 1.025 |
| Example B11 | $Li_3Y_{0.7}Sc_{0.3}Cl_6$ | 5.0E−04 | 2.056 | 1.152 | 1.633 | 1.911 | | 5.299 | 1.033 |
| Example B12 | $Li_3YCl_2Br_2I_2$ | 2.10E−03 | 1.896 | 1.155 | 1.636 | 1.916 | 1.999 | 5.738 | 1.034 |
| Example B13 | $Li_{3.2}Y_{0.8}Sr_{0.2}Br_6$ | 3.0E−04 | 1.934 | 1.155 | 1.636 | 1.920 | 2.003 | 5.619 | 1.022 |

TABLE 3

| Comparative Example | Composition | Conductivity (S/cm) | $q_1'$ | $q_2'/q_1'$ | $q_3'/q_1'$ | $q_4q1'$ | $q_5'/q_1'$ | $a_{ave}$ | $a_{ave}/a_{LiX}$ |
|---|---|---|---|---|---|---|---|---|---|
| Comparative Example 1 | $Li_2MgCl_4$ | 1.0E−06 | 2.098 | 1.156 | 1.635 | 1.920 | 2.004 | 5.179 | 1.010 |
| Comparative Example 2 | $Li_2FeCl_4$ | 5.0E−06 | 2.087 | 1.154 | 1.633 | 1.917 | 1.999 | 5.213 | 1.016 |
| Comparative Example 3 | $Li_{2.1}Y_{0.9}Zr_{0.1}Cl_6$ | 2.6E−05 | 2.092 | 1.152 | 1.628 | 1.910 | 1.988 | 5.218 | 1.017 |

Discussion

Examples A1 to A11 and B1 to B13 have been found to exhibit high ion conductivities of $1 \times 10^{-4}$ S/cm or more at or about room temperature, compared with Comparative Examples 1 to 3.

Figure 8:
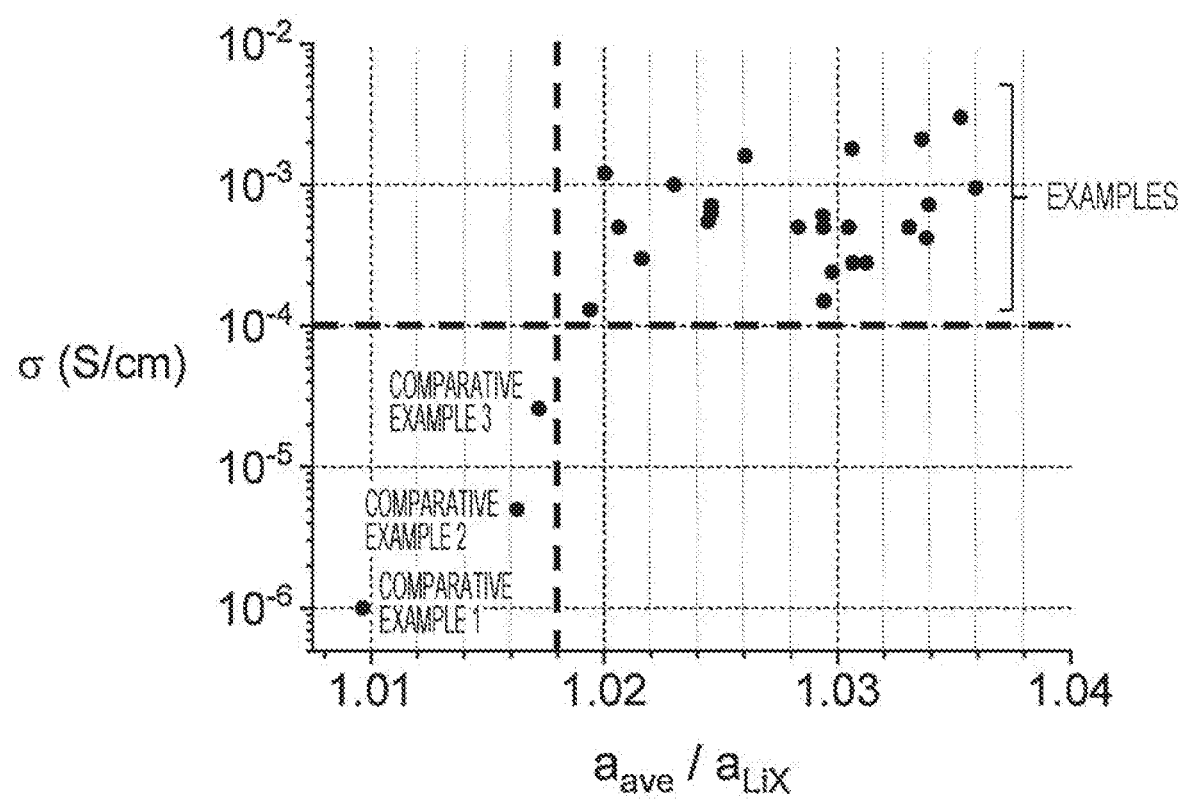
FIG. 8 is a graph of relationships between lithium-ion conductivity and $a_{ave}/a_{LiX}$ in Examples A1-A11 and B1-13 and Comparative Examples 1-3.

In Examples A1 to A11, peaks were observed in ranges of $q/q_2$ of 0.50 to 0.52, 1.28 to 1.30, and 1.51 to 1.54, which are characteristic peaks observed when sublattices composed of halogen ions have a hexagonal closest packed structure or a distorted hexagonal closest packed structure. In Examples B1 to B13, peaks were observed in ranges of $q/q'$ of 1.14-1.17, 1.625-1.645, 1.88-1.94, and 1.90-2.10, which are characteristic peaks observed when sublattices composed of halogen ions have a cubic closest packed structure or a distorted cubic closest packed structure. In Examples A1 to A11 and 1 to B13, the values of $a_{ave}/a_{LiX}$ were found to be 1.018 or more. This means that the lattices are about 1.8% or more expanded, compared with crystal structures having halogen proportions equivalent to the compositions of Examples A1 to A11 and B1 to B13 and composed only of lithium and halogen. On the other hand, in the Comparative Examples 1 to 3, the values of $a_{ave}/a_{LiX}$ were found to be less than 1.018. The relationships between ion conductivity and $a_{ave}/a_{LiX}$ in the present disclosure are illustrated in FIG. 8. It has been clearly demonstrated that, in the region of $a_{ave}/a_{LiX}$ of 1.018 or more, a good characteristic of ion conductivity at room temperature of $1 \times 10^{-4}$ S/cm or more is obtained.

In particular, comparison between Example A1 and Comparative Example 3 has revealed the following: in spite of the same constituent elements, the structure of Example A1 provided to have an $a_{ave}/a_{LiX}$ of more than 1.018 exhibits markedly increased ion conductivity, compared with Comparative Example 3.

In each of Examples A1 to A11 and B1 to B13, the battery exhibited charge/discharge operations at room temperature. On the other hand, in Comparative Example 2, discharge capacity was not substantially detected, and operations of the battery were not confirmed. In addition, the materials for Examples A1 to A11 and B1 to B13 do not include sulfur as a constituent element, so that generation of hydrogen sulfide does not occur.

Thus, it has been demonstrated that the solid electrolyte material according to the present disclosure is an electrolyte material that does not generate hydrogen sulfide, exhibits a high lithium-ion conductivity, and exhibits good charge/discharge operations.

What is claimed is:

1. A solid electrolyte material comprising:
   Li, M, and X, wherein
   M is at least one selected from metallic elements and contains Y,
   X is at least one selected from the group consisting of Cl, Br, and I,
   a plurality of atoms of X form a sublattice having a closest packed structure, and
   an average distance between two adjacent atoms of X among the plurality of atoms of X is 1.8% or more larger than a distance between two adjacent atoms of X in a rock-salt structure composed only of Li and X.

2. The solid electrolyte material according to claim 1, wherein
   a first converted pattern, which is obtained by converting an X-ray diffraction pattern of the solid electrolyte material such that a horizontal axis represents, instead of diffraction angle $2\theta$, q, includes a reference peak in a range of q of 2.11 Å$^{-1}$ or more and 2.31 Å$^{-1}$ or less, $q = 4\pi \sin\theta / \lambda$ where $\lambda$ is a wavelength of an X-ray, a second converted pattern, which is obtained by converting the X-ray diffraction pattern such that the horizontal axis represents, instead of diffraction angle $2\theta$, $q/q_2$, includes a peak in at least one selected from the group consisting of a first range of $q/q_2$ of 0.50 or more and 0.52 or less, a second range of $q/q_2$ of 1.28 or more and 1.30 or less, and a third range of $q/q_2$ of 1.51 or more and 1.54 or less, and $q_2$ is a value of q corresponding to the reference peak in the first conversion pattern.

3. The solid electrolyte material according to claim 2, wherein, in the second conversion pattern,
   when the peak is included in the first range, $c_1 = 2/3$; when the peak is not included in the first range, $c_1 = 0$, $c_2 = \sqrt{41/24}$, when the peak is included in the second range, $c_3 = \sqrt{17/6}$; when the peak is not included in the second range, $c_3 = 0$,
   when the peak is included in the third range, $c_4 = 2$; when the peak is not included in the third range, $c_4 = 0$,
   a value of q corresponding to the peak included in the first range is defined as $q_1$,
   a value of q corresponding to the peak included in the second range is defined as $q_3$,
   a value of q corresponding to the peak included in the third range is defined as $q_4$, $a_{ave} = 2\pi (\Sigma_{i=1}^{4} \sqrt{2} c_i / q_i) / n$ where n is a number of $c_i$ that satisfy $c_i \neq 0$,
   X includes Cl, Br, and I in a molar ratio of Cl:Br:I=$x_{Cl}$:$x_{Br}$:$x_I$ where $x_{Cl} + x_{Br} + x_I = 1$, $a_{LiCl} = 5.130$ Å, $a_{LiBr} = 5.500$ Å, $a_{LiI} = 6.0257$ Å, $a_{LiX} = x_{Cl} a_{LiCl} + x_{Br} a_{LiBr} + x_I a_{LiI}$ , and $a_{ave}/a_{LiX} > 1.018$.

4. The solid electrolyte material according to claim 1, wherein
   a first converted pattern, which is obtained by converting an X-ray diffraction pattern of the solid electrolyte material such that a horizontal axis represents, instead of diffraction angle 2θ, q, includes a reference peak in a range of q of 1.76 Å$^{-1}$ or more and 2.18 Å$^{-1}$ or less, $$q=4\pi \sin \theta/\lambda \text{ where } \lambda \text{ is a wavelength of an X-ray,}$$

a second converted pattern, which is obtained by converting the X-ray diffraction pattern such that the horizontal axis represents, instead of diffraction angle 2θ, $q/q_1'$, includes a peak in at least one selected from the group consisting of a first range of $q/q_1'$ of 1.14 or more and 1.17 or less, a second range of $q/q_1'$ of 1.62 or more and 1.65 or less, a third range of $q/q_1'$ of 1.88 or more and 1.94 or less, and a fourth range of $q/q_1'$ of 1.9 or more and 2.1 or less, and $q_1'$ is a value of q corresponding to the reference peak in the first conversion pattern.

5. The solid electrolyte material according to claim 4, wherein, in the second conversion pattern, $$c_1'=\sqrt{3},$$

when the peak is included in the first range, $c_2'=2$; when the peak is not included in the first range, $c_2'=0$, when the peak is included in the second range, $c_3'=2\sqrt{2}$; when the peak is not included in the second range, $c_3'=0$, when the peak is included in the third range, $c_4'=\sqrt{11}$; when the peak is not included in the third range, $c_4'=0$, when the peak is included in the fourth range, $c_5'=\sqrt{12}$; when the peak is not included in the fourth range, $c_5'=0$, a value of q corresponding to the peak included in the first range is defined as $q_2'$, a value of q corresponding to the peak included in the second range is defined as $q_3'$, a value of q corresponding to the peak included in the third range is defined as $q_4'$, a value of q corresponding to the peak included in the fourth range is defined as $q_5'$, $$a_{ave}=2\pi(\Sigma_{i=1}^{5} c_i'/q_i')/n'$$

where n' is a number of $c_i'$ that satisfy $c_i' \neq 0$,

X includes Cl, Br, and I in a molar ratio of Cl:Br:I=$x_{Cl}$:$x_{Br}$:$x_I$ where $x_{Cl}+x_{Br}+x_I=1$, $a_{LiCl}$=5.130 Å, $a_{LiBr}$=5.500 Å, $a_{LiI}$=6.0257 Å, $$a_{LiX}=x_{Cl}a_{LiCl}+x_{Br}a_{LiBr}+x_I a_{LiI}$$

, and $$a_{ave}/a_{LiX}>1.018.$$

6. The solid electrolyte material according to claim 1, wherein M further contains at least one selected from the group consisting of Mg, Ca, Sr, Ba, Zn, Sc, La, Al, Sm, Bi, Zr, Hf, Nb, and Ta.

7. The solid electrolyte material according to claim 1, wherein the solid electrolyte material is represented by a composition formula $Li_{a1}M_{a2}X_{a3}$, where (a1+a2)/a3<0.7.

8. A battery comprising:

a positive electrode;

a negative electrode; and an electrolyte layer disposed between the positive electrode and the negative electrode, wherein at least one selected from the group consisting of the positive electrode, the negative electrode, and the electrolyte layer contains the solid electrolyte material according to claim 1.

* * * * *